(12) United States Patent
Collmeyer et al.

(10) Patent No.: US 7,554,821 B1
(45) Date of Patent: Jun. 30, 2009

(54) SYSTEM AND METHOD FOR INPUT CURRENT SHAPING IN A POWER CONVERTER

(75) Inventors: Arthur J. Collmeyer, Incline Village, NV (US); Anatoly Shteynberg, San Jose, CA (US); Junjie Zheng, Campbell, CA (US); Paul F. King, Celebration, FL (US); Dickson T. Wong, Burlingame, CA (US); Harry Rodriguez, Gilroy, CA (US)

(73) Assignee: iWatt Inc., Los Gatos, CA (US)

( * ) Notice: Subject to any disclaimer, the term of this patent is extended or adjusted under 35 U.S.C. 154(b) by 0 days.

(21) Appl. No.: 12/146,261

(22) Filed: Jun. 25, 2008

Related U.S. Application Data

(60) Division of application No. 10/880,221, filed on Jun. 28, 2004, now Pat. No. 7,433,211, which is a continuation-in-part of application No. 10/610,977, filed on Jun. 30, 2003, now Pat. No. 6,944,034.

(51) Int. Cl.
 *H02M 3/335* (2006.01)
(52) U.S. Cl. .................. 363/21.13; 363/17; 363/95; 323/282; 323/299

(58) Field of Classification Search ............ 363/21.13, 363/17, 95, 89, 98, 16, 20, 37, 21.4, 21.17; 323/282–286, 222, 299, 205, 207
See application file for complete search history.

(56) References Cited

U.S. PATENT DOCUMENTS

| | | | | |
|---|---|---|---|---|
| 4,641,232 A | * | 2/1987 | Pitel | 363/71 |
| 4,896,254 A | * | 1/1990 | Bennett | 363/50 |
| 5,014,180 A | * | 5/1991 | Nuechterlein | 363/56.01 |
| 5,264,732 A | * | 11/1993 | Fiorina et al. | 307/66 |
| 5,371,666 A | * | 12/1994 | Miller | 363/98 |
| 6,154,376 A | * | 11/2000 | Dan-Harry | 363/21.02 |

* cited by examiner

*Primary Examiner*—Rajnikant B Patel
(74) *Attorney, Agent, or Firm*—Fenwick & West LLP

(57) ABSTRACT

A power converter delivers electrical power from an electrical power source to a load according to a plurality of operation modes, where at least one of the operation modes is a peak current switching mode. Under the peak current switching mode, a switch controller controls the switch in the power converter to be kept on until the current through the switch reaches a peak current value corresponding to a given phase of the input voltage signal to the power converter. The peak current values have a reference shape, which may be a trapezoidal. The power converter may have any topology, such as a flyback-type power converter or a boost-type power converter.

62 Claims, 19 Drawing Sheets

SYSTEM AND METHOD FOR INPUT CURRENT SHAPING IN A POWER CONVERTER

CROSS-REFERENCE TO RELATED APPLICATIONS

This application is a divisional application under 35 U.S.C. § 121 of, and claims priority under 35 U.S.C. §120 from, U.S. patent application Ser. No. 10/880,221 entitled "System and Method for Input Current Shaping in a Power Converter," filed on Jun. 28, 2004 now U.S. Pat. No. 7,433,211, which is a continuation-in-part application of, and claims priority under 35 U.S.C. § 120 from, U.S. patent application Ser. No. 10/610,977, entitled "System and Method for Input Current Shaping In a Power Converter," filed on Jun. 30, 2003, now issued as U.S. Pat. No. 6,944,034, both of which are incorporated by reference herein in their entirety. This application is also related to U.S. patent application Ser. No. 12/146,273, entitled "System and Method for Input Current Shaping in a Power Converters" filed on Jun. 25, 2008.

TECHNICAL FIELD

The present invention relates generally to a power converter, and more specifically, to a system and method for input current shaping in off-line power supplies.

BACKGROUND OF THE INVENTION

Shaping input current in power supplies to have a waveform close to a sinusoidal waveform has the potential of reducing or eliminating undesirable harmonics and of increasing power factor. Power factor in power converters is defined as the ratio of the real power delivered to the load to the apparent power provided by the power source. Regardless of what topology is used in the power converters, power converters should be able to deliver power from the power source to the load with a high power factor and low harmonic distortion. This is because utility companies or government agencies require power factors in power converters to exceed a certain minimum level by regulation.

There were a number of attempts at providing power converters with high power factors. For example, U.S. Pat. No. 5,751,561 to Ho et al. discloses an AC-to-DC power converter that purports to achieve greater than 0.8 power factor correction with greater than 75 percent efficiency using only one power switch, only one magnetic component, only one control loop, and a storage capacitor. U.S. Pat. No. 5,991,172 to Jovanovic et al. also discloses a single stage, single switch flyback converter, in which the turn-on switching losses due to the discharge of the output capacitance of the switch are reduced by turning on the switch when its voltage is minimal. The fly-back converter stage is continuously operated at the boundary of continuous conduction mode (CCM) and discontinuous conduction mode (DCM) by employing a variable frequency control. Furthermore, U.S. Pat. No. 6,038,146 to Luo et al. also discloses an AC-to-DC power converter with high power factor and which minimizes the input charging current flowing through the separate inductor by locating a separate inductor between a full-bridge rectifier and the transformer but out of the storage capacitor's current path.

In general, the power converters in these patents achieve power factor correction by providing one current shaper inductor along with a transformer and a bulk capacitor for storage of energy. These conventional power converters may work well in a given range of input voltage levels, but none of these conventional power converters can deliver electrical power with high power factors over a broad or full range of input voltage. Because the conventional power converters typically operate in a single mode (such as DCM or CCM) over the entire range of input voltage, they have high power factor over a certain range of input voltage in which they were designed to operate but have low power factor in other ranges of input voltage.

Accordingly, conventional power converters typically use two closed feedback loops. One closed feedback loop is used for regulating the output voltage to a desired level, and the other closed feedback loop is used for controlling the amplitude of the input current. The implementation of these conventional power converters requires complex circuitry further requiring considerable efforts to stabilize them. Furthermore, the conventional power converters have a particular topology, but none of the control strategy for these conventional power converters may be used with different topologies of power converters.

Therefore, there is a need for a power converter that can deliver electrical power from a power source to a load with a shaped input current over a wide range of input voltage. There is also a need for a power converter that can be implemented by non-complex circuitry. There is also a need for a power converter that can ensure that the input current to the power converter is precisely shaped to a desired reference waveform. Finally, there is a need for a method and system compatible with different topologies of power converters for providing power factor correction over a wide range of input voltage.

SUMMARY OF INVENTION

A power converter delivers electrical power from an electrical power source to a load according to a plurality of operation modes, wherein at least one of the operation modes incorporates peak current switching. The power converter comprises a power stage for delivering the electrical power from the power source to the load, a switch in the power stage that electrically couples or decouples the load to the power source, and a switch controller coupled to the switch for controlling the turn-on times and turn-off times of the switch according to the plurality of operation modes. With peak current switching, the switch controller keeps the switch on until the current through the switch reaches a prescribed peak current value corresponding to the phase of the input voltage signal to the power converter. The prescribed peak current values derive from a reference shape of peak current, and in one embodiment, the reference shape of the peak current is a trapezoidal approximation of a sinusoid. The power converter may have any topology, such as a flyback-type power converter or a boost-type power converter.

In one embodiment of the present invention, the power converter is a flyback power converter operated in a plurality of modes including critical discontinuous conduction mode ("CDCM") with different modes determined by the phase ranges (i.e., first, second, and third range) of the input voltage to the power converter. In the second phase range of the input voltage, the power converter is operated in CDCM with zero voltage switching and peak current switching, with peak current values derived from a reference shape of peak current. Zero voltage switching turns the switch in the flyback power converter on when the reflected voltage on the auxiliary winding of the transformer in the flyback power converter falls to zero. Peak current switching keeps the switch on until the current through the switch reaches a prescribed peak current value corresponding to the phase of the input voltage signal to the power converter, at which time the switch is turned off. In one embodiment, the reference shape of the peak current is a trapezoidal approximation of a sinusoid. In the first and third phase ranges of the input voltage, the power converter is controlled such that the switch is turned on and off with fixed on-times and fixed off-times. Additionally, the power converter may also be operated in pulse frequency modulation mode under low load conditions.

In another embodiment of the present invention, the power converter is a flyback power converter operated in a plurality of modes including continuous conduction mode ("CCM") with different modes determined by the phase ranges (i.e., first, second, and third range) of the input voltage to the power converter. In the second phase range of the input voltage, the power converter is operated in CCM with shaped off-time switching with off-time values derived from a first reference shape and peak current switching with peak current values derived from a second reference shape. Shaped off-time switching controls keeps the switch off until the duration of the off-time of the switch reaches a prescribed off-time value corresponding to the phase of the input voltage signal to the power converter, at which time the switch is turned on. Peak current switching keeps the switch on until the current through the switch reaches a peak current value corresponding to the phase of the input voltage signal to the power converter, at which time the switch is turned off. In one embodiment, the second reference shape of the peak current is a trapezoidal approximation of a sinusoid. In the first and third phase ranges of the input voltage, the power converter is controlled such that the switch is turned on and off with fixed on-times and fixed off-times. Additionally, the power converter may also be operated in pulse frequency modulation mode under low load conditions.

In still another embodiment of the present invention, the power converter is a boost power converter operated in a plurality of modes including continuous conduction mode ("CCM") with different modes determined by output current. In the high output-current or CCM mode, the boost power converter is operated with shaped off-time switching with off-time values derived from a first reference shape, and peak current switching with peak current values derived from a second reference shape. Shaped off-time switching keeps the switch off until the duration of the off-time of the switch reaches a prescribed off-time value corresponding to the phase of the input voltage signal to the power converter, at which time the switch is turned on. Peak current switching keeps the switch on until the current through the switch reaches a peak current value corresponding to the phase of the input voltage signal to the power converter, at which time the switch is turned off. In one embodiment, the second reference shape of the peak current is a trapezoidal approximation of a sinusoid. Additionally, the power converter may also be operated in pulse frequency modulation mode under low load conditions.

The power converter of the present invention and the method for controlling the power converter can transfer electrical power from a power source to a load with a high power factor over a wide range of input voltage with the input current shaped by the reference shape of peak current. Peak current switching ensures that the peak input current to the power converter does not exceed the peak current values prescribed for the corresponding phase of the input voltage to the power converter according to the reference shape of peak current, and thus the shape of the input current is determined by the reference shape. The power converter and the method for controlling the power converter of the present invention are compatible with different topologies of power converters, including flyback power converters and boost-type power converters, providing an input current shaped by the reference waveform, to achieve regulation of output voltage with high power factor over a wide range of input voltage.

BRIEF DESCRIPTION OF THE DRAWINGS

The teachings of the present invention can be readily understood by considering the following detailed description in conjunction with the accompanying drawings.

DETAILED DESCRIPTION OF EMBODIMENTS

Figure 1A:
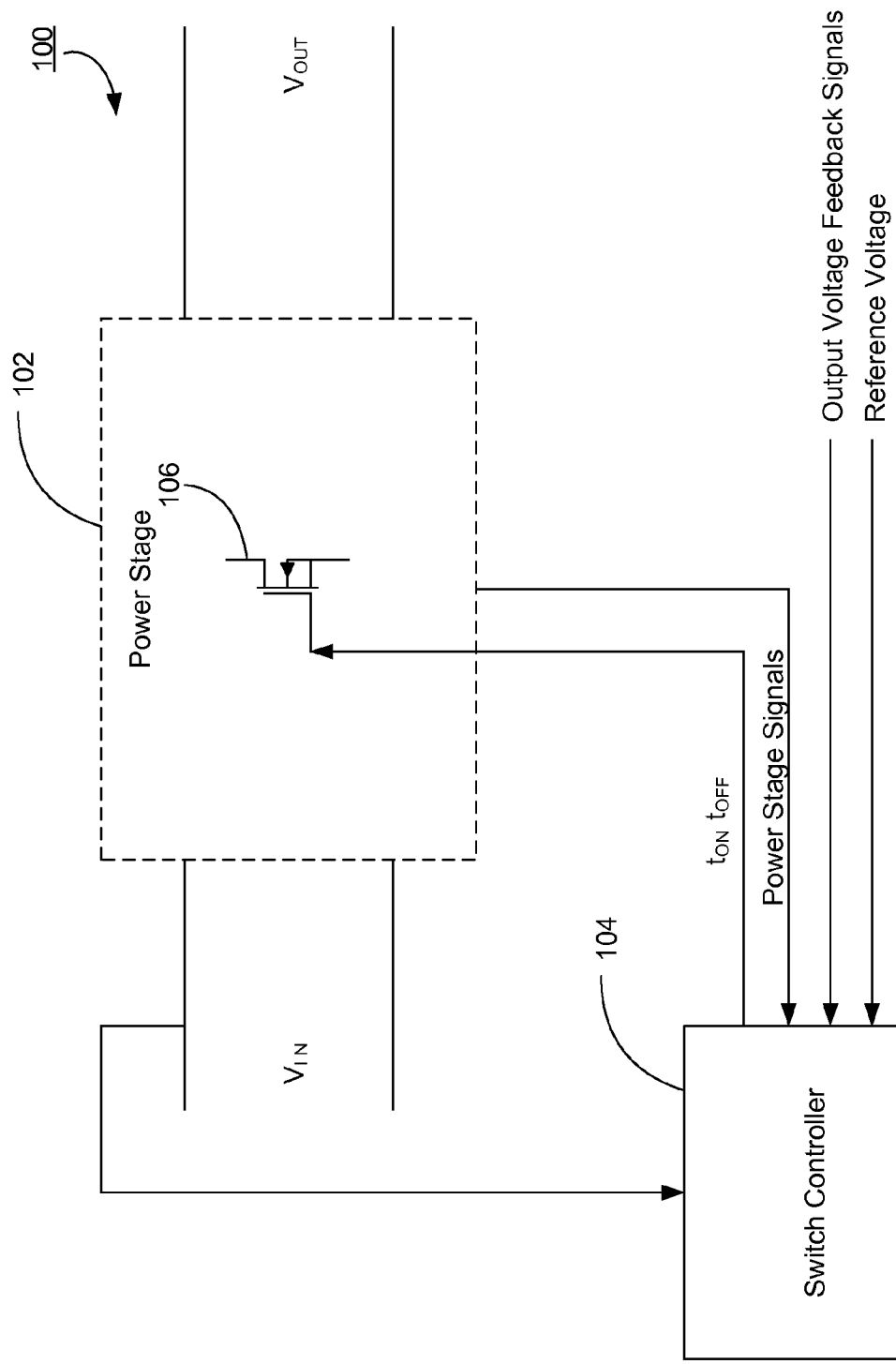
FIG. 1A is a block diagram of a power converter according to one embodiment of the present invention.

The embodiments of the present invention will be described below with reference to the accompanying drawings. Like reference numerals are used for like elements in the accompanying drawings.

FIG. 1A is a diagram of the power converter 100 according to one embodiment of the present invention. The power converter 100 includes a power stage 102 and a switch controller 104. The power stage 102 receives full-wave rectified input voltage $V_{IN}$ from an electrical power source (not shown) and transfers power to a load (not shown) with an output voltage $V_{OUT}$ by turning the switch 106 on and off to couple or decouple the input voltage $V_{IN}$ to or from the output. The switch 106 is a conventional MOSFET switch but any other type of switch or any number of switches may be used.

The switch controller 104 generates pulses to open or close the switch 106 so that the power stage 102 can deliver electrical power with high power factor, e.g., 0.90 or more. In one embodiment, the switch controller 104 senses the input voltage $V_{IN}$, output voltage feedback signals, a reference voltage, power converter parameters, and other power stage signals such as the switch current, to maintain the output voltage $V_{OUT}$ at a desired level. Using these inputs, the switch controller 104 generates pulses for driving the switch 106 on at on-times $t_{ON}$ and off at off-times $t_{OFF}$, so that the input current is shaped to minimize undesirable harmonics regardless of the amplitude of the input voltage, $V_{IN}$.

The switch controller 104 may optionally include an operation mode selector module (not shown) for selecting different operation modes to achieve high power factor conversion under varying line, $V_{IN}$, and load conditions. With an operation mode selector module, the switch controller 104 controls the on-times and off-times in accordance with the selected operation mode. The operation modes may include any of the conventional modes for operating power converters, such as Continuous Conduction Mode (CCM) or Critical Discontinuous Conduction Mode (CDCM), and they are selected to operate the power converter 100 such that a high power factor is maintained regardless of the amplitude of the input voltage, $V_{IN}$.

Figure 1B:
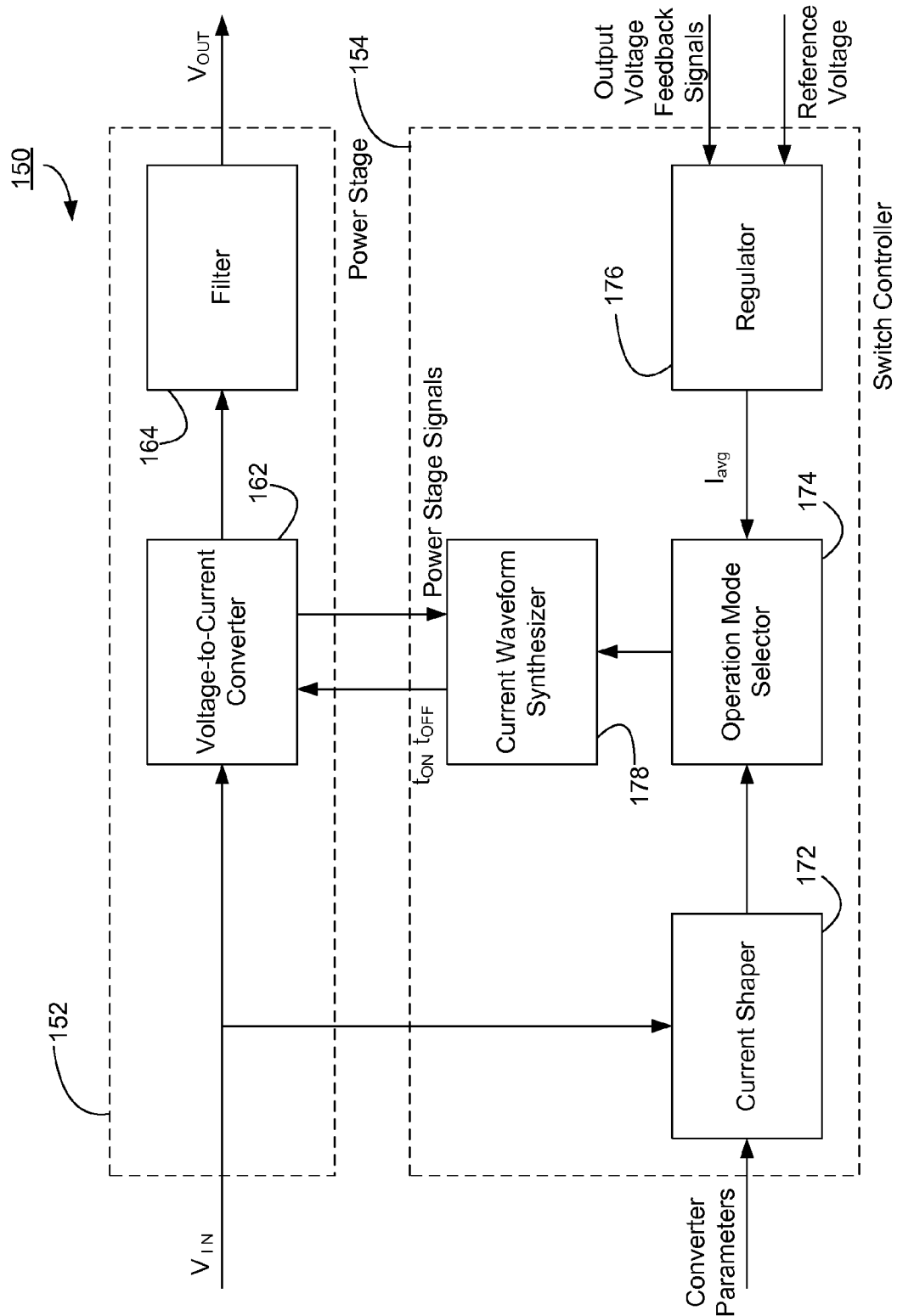
FIG. 1B is a block diagram of a power converter according to another embodiment of the present invention.

FIG. 1B is a block diagram illustrating the power converter 150 according to another embodiment of the present invention. The power converter 150 is capable of transferring power at a high power factor by converting a full-wave rectified AC voltage $V_{IN}$ into a current source in an open loop configuration and regulating the output voltage $V_{OUT}$ to a reference voltage. The power converter includes a power stage 152 and a switch controller 154. The power stage 152 includes a voltage-to-current converter module 160 and an output filter module 164, and the switch controller 154 includes a current shaper module 172, an operation mode selector module 174, a voltage regulator module 176, and a current synthesizer module 178.

Referring to FIG. 1B, the voltage regulator module 176 tracks the output voltage feedback signals against the reference voltage, and generates a feedback control signal $I_{avg}$ for regulating the power converter 150. The feedback control signal $I_{avg}$ is generated to be proportional to the integral of the input current to the power converter 150, or any other power converter signal proportional to the input current, over a predetermined period of time, regardless of the shape, form, and frequency of the input AC current. As such, the feedback control signal $I_{avg}$ may also serve as a proxy for output (load) current. Besides generating the feedback control signal $I_{avg}$, the voltage regulator module 176 also detects sudden changes in the load and signals such changes to the operation mode selector module 174.

The current shaper module 172 receives the full-wave rectified input voltage $V_{IN}$, and also receives power converter parameters including, among other things, the prescribed reference shape or shapes for the input current, the windings ratio of the transformer (not shown) used in the voltage-to-current converter module 162, and the desired output voltage (reference voltage), and generates timing information and current waveform synthesis parameters used by the operation mode selector module 174 and the current waveform synthesizer module 178.

The optional operational mode selector 174 receives input from the current shaper module 172 and the voltage regulator 176, selects the operation mode appropriate for the prevailing line voltage and output current, and outputs timing and current waveform synthesis parameters to the current waveform synthesizer module 178.

The current waveform synthesizer module 178 receives the timing information, current waveform synthesis parameters, and the feedback control signal $I_{avg}$ from the operation mode selector module 176, and synthesizes in real time the desired current waveform by controlling the turn-on times and the turn-off times of the switch in the power stage 152.

Under certain operation modes, the waveform synthesis process may be facilitated by the availability of certain power stage signals. For example, where the operation mode is CDCM and the power converter 150 is a flyback converter, waveform synthesis is facilitated by the availability of a reflected output voltage, $V_{ROUT}$, which is the voltage reflected on the auxiliary windings of a transformer (not shown) in the voltage-to-current converter 162. In this case, the turn-on timing could be derived from $V_{ROUT}$ using zero voltage switching using the method described in, for example, U.S. Pat. No. 6,304,473 to Telefus et al. The waveform synthesis process can similarly be facilitated by the availability of a switch current measurement, $I_{SW}$, i.e., the current through the switch in the power stage 152. In this case, the turn-off timing can be derived by managing (limiting) the pulse-to-pulse peak values of the switch current ($I_{SW}$) not to exceed the prescribed peak switch current values (peak current switching).

Figure 1C:
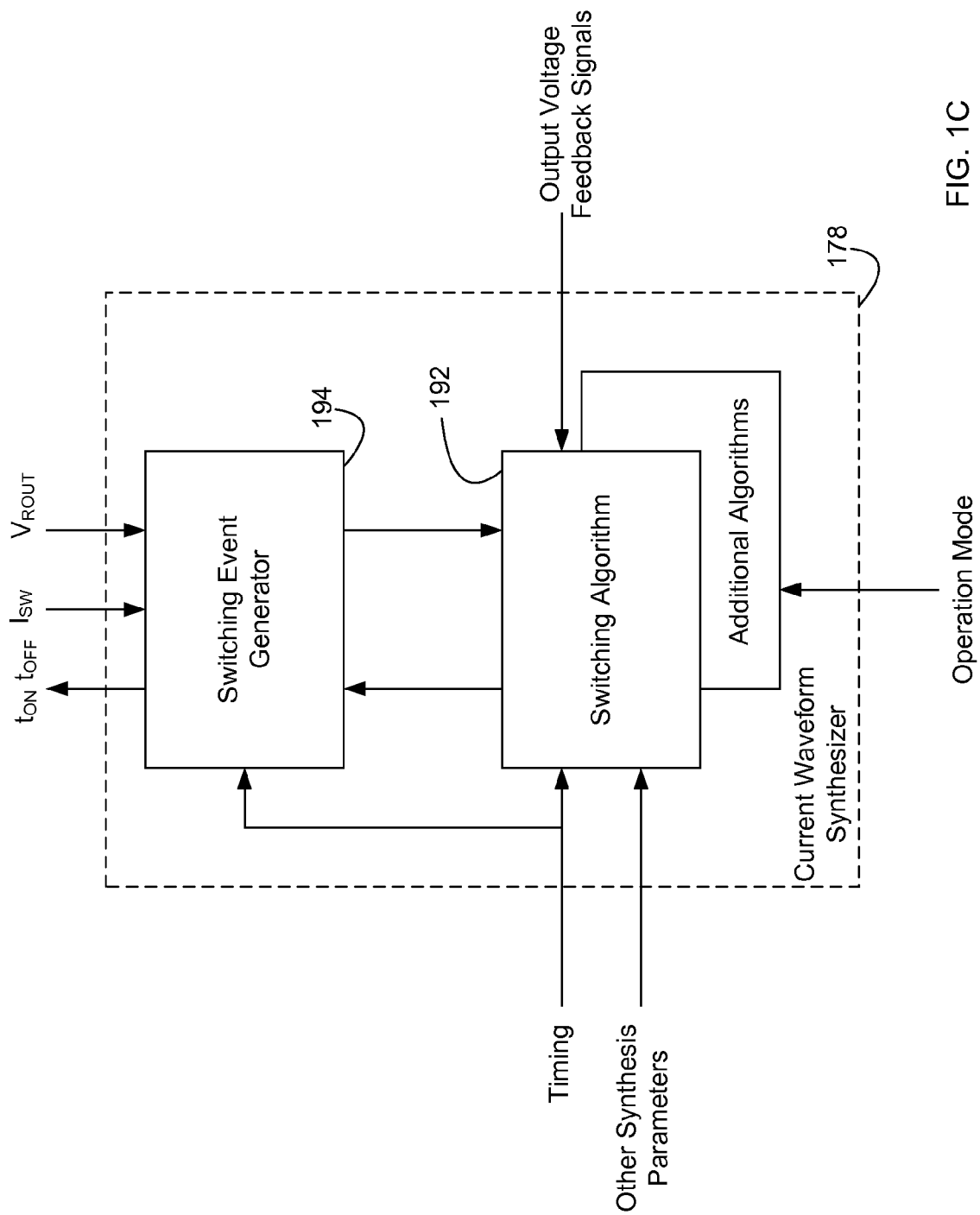
FIG. 1C is a block diagram of a current waveform synthesizer according to one embodiment of the present invention.

FIG. 1C describes one embodiment of a current waveform synthesizer module 178. It includes a switching event generator module 194 and one or more switching algorithm modules 192, generally one for each operation mode in the event multiple operation modes are used.

The switching event generator module 194 generates turn-on-time events ($t_{ON}$) and turn-off-time events ($t_{OFF}$) to turn on and turn off the switch 106. Because these events may be generated internally (within the switching event generator module 194), they are likewise output to the switching algorithm modules 192 to facilitate the generation of subsequent switching events. The switching event generator module 194 processes power stage signals as well as inputs from the switching algorithm modules.

One example of a power stage signal is the reflected output voltage signal, $V_{ROUT}$, which could be used to derive the turn-on timings. For example, the switching event generator 194 may use reflected output voltage signal $V_{ROUT}$ to derive the turn-on timings based upon zero voltage switching. Zero voltage switching controls the switch in the voltage-to-current converter 162 to be turned on when the reflected output voltage signal $V_{ROUT}$ falls to zero.

Another example of a power stage signal is the switch current, $I_{SW}$, which could be used to derive the turn-off timings. For example, the switching event generator may use the switch current $I_{SW}$ to derive the turn-off timings based upon peak current switching. Peak current switching controls the switch in the voltage-to-current converter 162 to be turned off when the switch current $I_{SW}$ reaches the peak current values of a prescribed reference shape. Thus, the switch current $I_{SW}$ (and implicitly the input current to the power converter) is shaped by the reference shape of peak switch current.

The switching algorithm module 192 provides signals to enable/disable zero voltage switching and/or peak current switching depending upon the selected operation mode. Other examples of outputs from the switching algorithm module 192 include the duration of the ON time ($T_{ON}$) of the switch 106 in the voltage-to-current converter 162, the duration of the OFF time ($T_{OFF}$) of the switch 106 in the voltage-to-current converter 162, the duty cycle for the switch 106, and peak switch current. As stated previously, the peak switch current is the prescribed maximum that the switch current should not exceed.

The switching algorithm modules 192, as many as one for each operation mode, synthesize current waveforms by controlling, through the switching event generator 194, the turn-on timings and turn-off timings of the switch 106 in the voltage-to-current converter 162. Each of the switching algorithms applies the timing, synthesis parameter inputs and the feedback control signal input via the operation mode selector module 174 to realize, through the switching event generator 194, the desired input current waveform for the power converter. The timing and synthesis parameter inputs will be explained in more detail below.

Figure 2A:
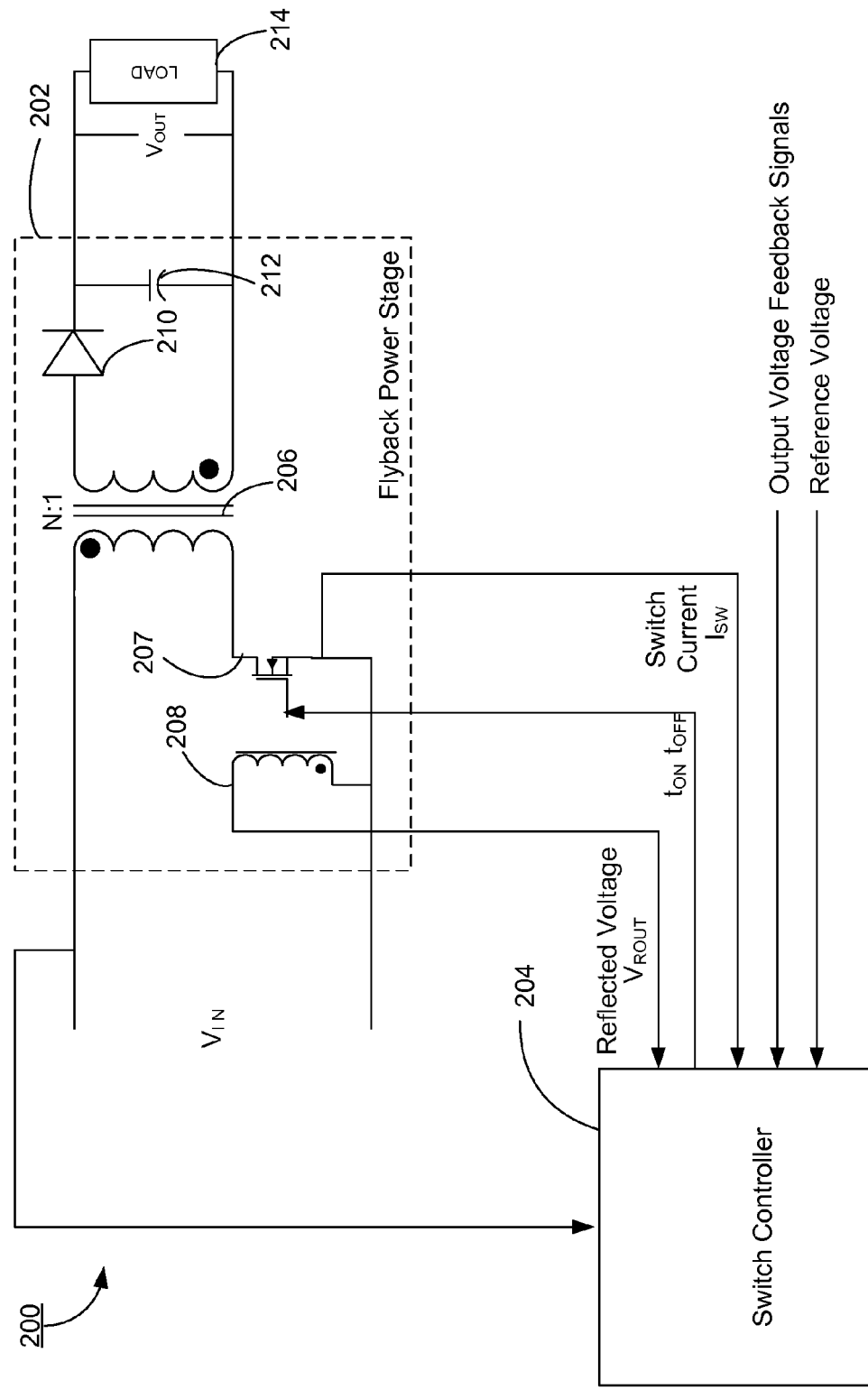
FIG. 2A is a diagram of a single-stage flyback power converter operated in a plurality of modes including critical discontinuous conduction mode with peak current switching, according to one embodiment of the present invention.

FIG. 2A is a diagram of a single-stage flyback power converter 200 operated in one or more operation modes including critical discontinuous conduction mode with peak current switching, according to one embodiment of the present invention. The power converter 200 includes a flyback power stage 202 and a switch controller 204. The power stage 202 includes a switch 207, a transformer 206 with an auxiliary winding 208, a diode 210, and a capacitor 212. The power stage 202 receives the full-wave rectified input voltage $V_{IN}$ from an electrical power source (not shown) and transfers power to a load 214 with an output voltage $V_{OUT}$ by turning on and off the switch 207 to couple or decouple the input voltage $V_{IN}$ to the load 214 through the diode 210. The switch 207 is a conventional MOSFET switch, but any other type of switch may be used.

The switch controller 204 generates pulses to open or close the switch 207 so that the power stage 202 can transfer electrical power with a high power factor, e.g., 0.90 or more. The switch controller 204 senses the input voltage $V_{IN}$, the switch current $I_{SW}$, and also senses the output voltage feedback signals and a reference voltage, for the purpose of maintaining the output voltage level $V_{OUT}$ at a desired level. Using these inputs, the switch controller 204 generates pulses for driving the switch 207 on at times $t_{ON}$, and off at times $t_{OFF}$, so that the power factor of the power converter 200 is maintained at a high level.

The switch controller 204 may incorporate an operation mode selection module (not shown) for the selection of different modes of operation to achieve high power factor conversion under varying line ($V_{IN}$) and load conditions. With an operation mode selector module, the switch controller 204 controls the on-times and off-times in accordance with the selected operation mode. The operation modes may include conventional modes for operating power converters, such as Critical Discontinuous Conduction Mode (CDCM) or Pulse Frequency Modulation (PFM), and they are selected to operate the power converter 200 such that a high power factor is maintained regardless of the amplitude of the input voltage $V_{IN}$.

Figure 2B:
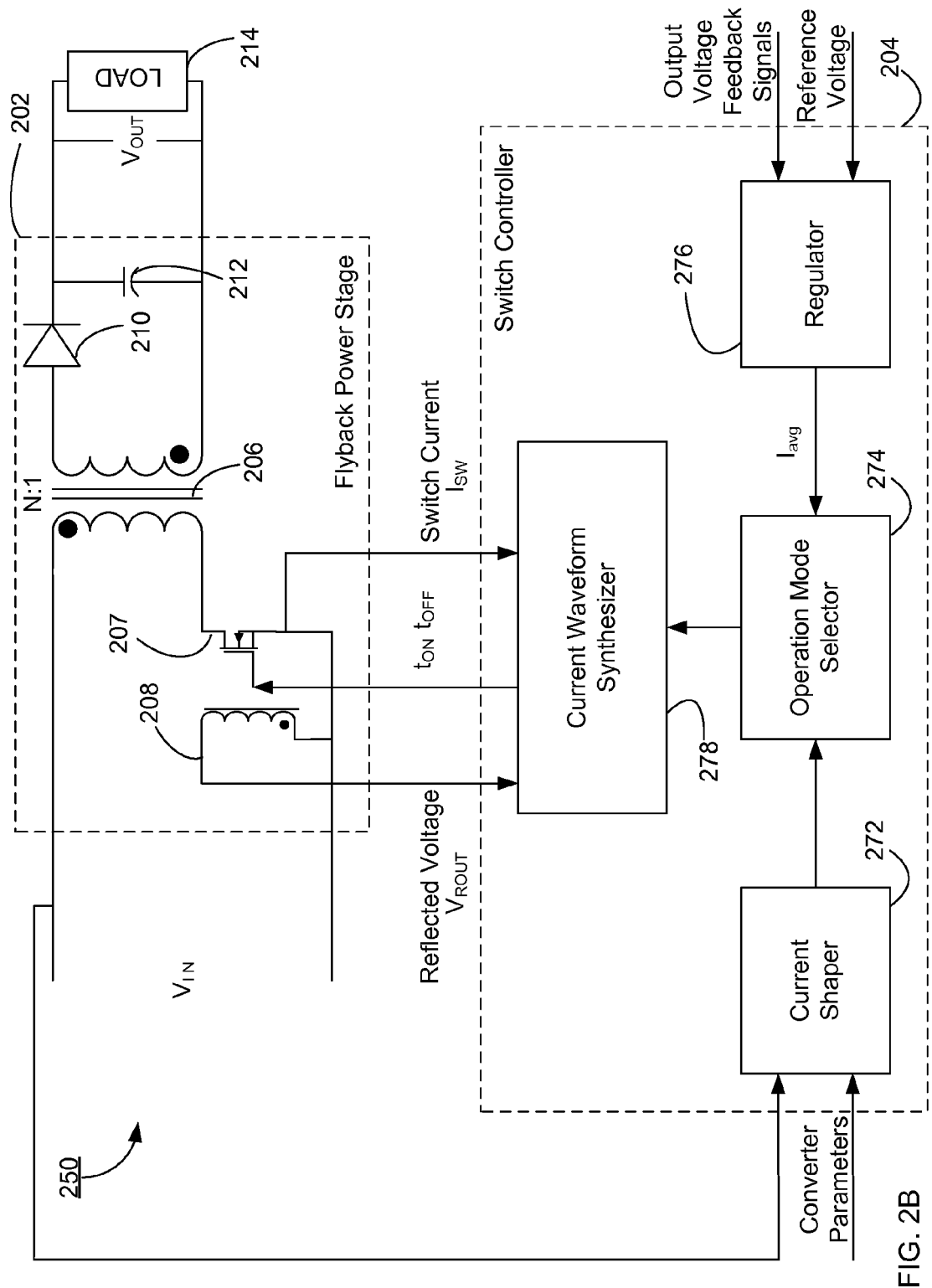
FIG. 2B is a block diagram illustrating a single-stage flyback power converter, operated in a plurality of modes including critical discontinuous conduction mode with peak current switching, according to another embodiment of the present invention.

FIG. 2B is a block diagram illustrating a single-stage flyback power converter 250 operated in a plurality of modes including CDCM with peak current switching, according to another embodiment of the present invention. The power converter includes a flyback power stage 202, and a switch controller 204. The flyback power stage 202 includes a switch 207, a transformer 206 with an auxiliary winding 208, a diode 210, and a capacitor 212. The switch controller 204 includes a current waveform synthesizer module 278, a current shaper module 272, an operation mode selector module 274, and a regulator module 276. The power converter 250 is capable of transferring power at high power factor by converting the full-wave rectified AC input voltage $V_{IN}$ into a current source in an open loop configuration and regulating the output voltage $V_{OUT}$ to a reference voltage.

Figure 2C:
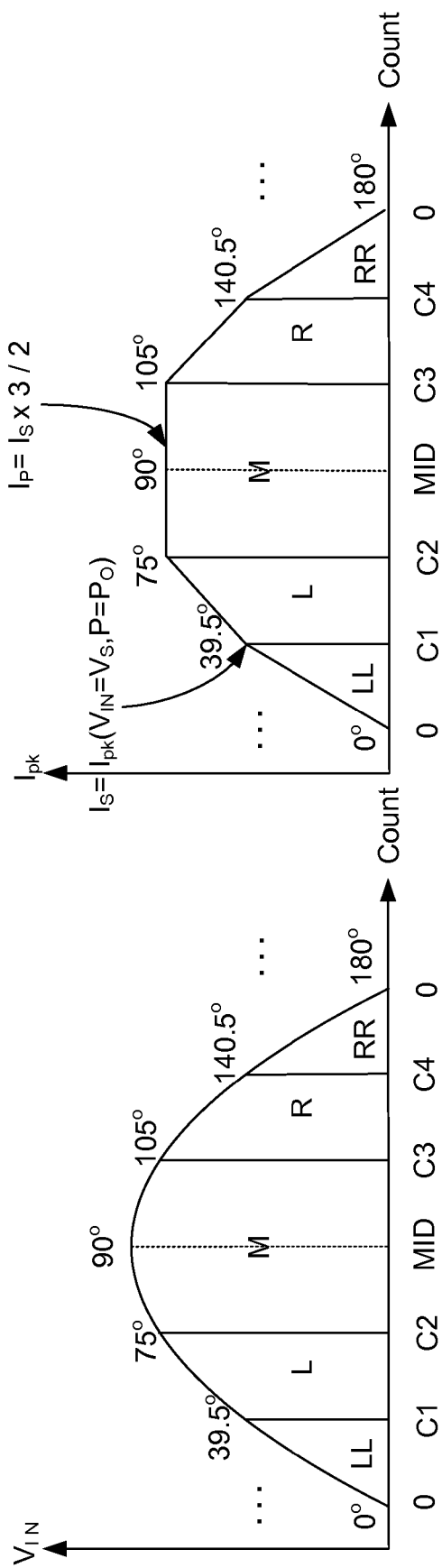
FIG. 2C are graphs illustrating the input voltage ($V_{IN}$), the reference shape of the peak switch current ($I_{pk}$), and the phase ranges defining the different operation modes used by the switch controller in FIG. 2B to control the power stage.

The switch controller 204 controls the power stage 202 with different operation modes depending upon the phase of the input voltage $V_{IN}$, as described in FIG. 2C. FIG. 2C are graphs illustrating the input voltage $V_{IN}$, the reference shape of the peak switch current $I_{pk}$, and the phase regions defining the different operation modes used by the controller 204 in FIG. 2B to control the power stage 202. The switch controller 204 controls the switch current $I_{SW}$ through the switch 207 so as not to exceed the reference shape of peak switch current $I_{pk}$ at any instant. The reference shape of peak switch current $I_{pk}$ is a trapezoidal approximation of a sinusoidal waveform, phase coherent with the input voltage $V_{IN}$. Because the reference trapezoidal shape is but an approximation of the sinusoidal waveform of $V_{IN}$, the power converter 250 trades off slightly reduced power factor in favor of precise output current limits.

Referring to FIG. 2C, $V_{IN}$ and $I_{pk}$ are shown divided into five regions based upon the phase of the input voltage, i.e., LL (0-C1 between 0°-39.5°), L (C1-C2 between 39.5°-75°), M (C2-C3 between 75°-105°), R (C3-C4 between 75°-140.5°), and RR (C4-0 between 140.5°-180°), as measured by a counts 0, C1, C2, MID, C3, C4, and 0 of a counter (not shown). The counter starts at 0 and resets to 0 once it passes C4 and the phase of the input voltage reaches 180 degrees. As shown in FIG. 2C, the reference shape of peak current $I_{pk}$ has the shape of a trapezoidal approximation of a sinusoidal waveform, increasing substantially linearly from 0 to $I_S$ at a first rate when the count is between 0 and C1, increasing substantially linearly from $I_S$ to $I_P$ at a second rate when the count is between C1 and C2, being constant at $I_P$ when the count is between C2 and C3, decreasing substantially linearly from $I_P$ to $I_S$ at a third rate when the count is between C3 and C4, and decreasing substantially linearly from $I_S$ to 0 at a fourth rate when the count is between C4 and 0. $I_S$ is defined as the $I_{pk}$ value when $V_{IN}$ equals $V_S$ (average of $V_{IN}$) and when the output power equals the rated output power $P_O$. The peak value $I_P$ is defined as $I_S \times \frac{3}{2}$.

When the load 214 exceeds a predetermined fraction (e.g., 0.25) of a full load, the switch controller 204 controls the switch 207 differently in three of the phase ranges, i.e., when the count is between 0 and C1, when the count is between C1 and C4, and when the count is between C4 and 0. In regions LL ($0<\text{count}<C1$) and RR ($C4<\text{count}<0$), the switch controller 204 controls the power stage 202 with fixed on-time and fixed off-time switching (FOT$^2$) (fixed durations of on-times and off-times of the switch 207). In regions L, M, and R ($C1<\text{count}<C4$), the switch controller 204 controls the power stage 202 by Critical Discontinuous Conduction Mode (CDCM), where the turn-on timings ($t_{ON}$) of the switch 207 are determined by zero voltage switching (ZVS) and the turn-off timings ($t_{OFF}$) of the switch 207 are determined by peak current switching. Peak current switching means that the switch 207 will be kept on until the switch current $I_{SW}$ reaches the reference shape of peak switch current $I_{pk}$, at which point the switch 207 is turned off. Since the switch current $I_{SW}$ is turned off according to the reference shape of peak switch current $I_{pk}$, the switch current $I_{SW}$ (and implicitly, the input current to the power converter 250) will be shaped by the reference shape of peak switch current $I_{pk}$. In this embodiment, a trapezoidal approximation of a sinusoidal waveform is used as the reference shape of peak switch current, as shown in FIG. 2C. Zero voltage switching means that the switch 207 will be kept off until the reflected voltage $V_{ROUT}$ falls to zero, at which point the switch 207 is turned on.

When the load 214 drops below a predetermined fraction (e.g., 25%) of a full load, the switch controller controls the power stage 202 with pulse frequency modulation regardless of the count (or phase of the input voltage $V_{IN}$).

Referring back to FIG. 2B, the voltage regulator module 276 tracks the output voltage feedback signal against the reference voltage, and generates a feedback control signal $I_{avg}$ for regulating the power converter 250. The feedback control signal $I_{avg}$ is generated to be proportional to the integral of the input current, or any other power converter signal proportional to the input current, over a predetermined period of time, regardless of the shape, form, and frequency of the input AC current. As such, the feedback control signal $I_{avg}$ may also serve as a proxy for output current through the load 214. Besides generating the feedback control signal $I_{avg}$, the voltage regulator module 276 also detects sudden changes in the load 214 and signals them to the operation mode selector 274.

The current shaper module 272 receives the full-wave rectified input voltage $V_{IN}$, and also receives power converter parameters including, among other things, the reference shape of peak current, the winding ratio of the transformer 206 used in the power converter 250, and the desired output voltage, and generates the timing information and current waveform synthesis parameters used by the operation mode selector module 274 and the current waveform synthesizer module 278.

The operation mode selector module 274 receives input from the current shaper module 272 and the voltage regulator module 276, selects the operation mode (CDCM with peak current switching and zero voltage switching, fixed on-time and off-time switching, or pulse frequency modulation (PFM)) appropriate for the phase range of the input voltage $V_{IN}$ as described in FIG. 2C, or the level of the load, and outputs timing and waveform synthesis parameters to the current waveform synthesizer module 278.

The current waveform synthesizer module 278 receives the selected operation mode as well as the timing information, current waveform synthesis parameters, and the feedback control signal $I_{avg}$ from the operation mode selector module 276, and synthesizes in real time the desired current waveform by controlling the turn-on timings ($t_{ON}$) and turn-off timings ($t_{OFF}$) of the switch 207 in the power stage 202.

Figure 2D:
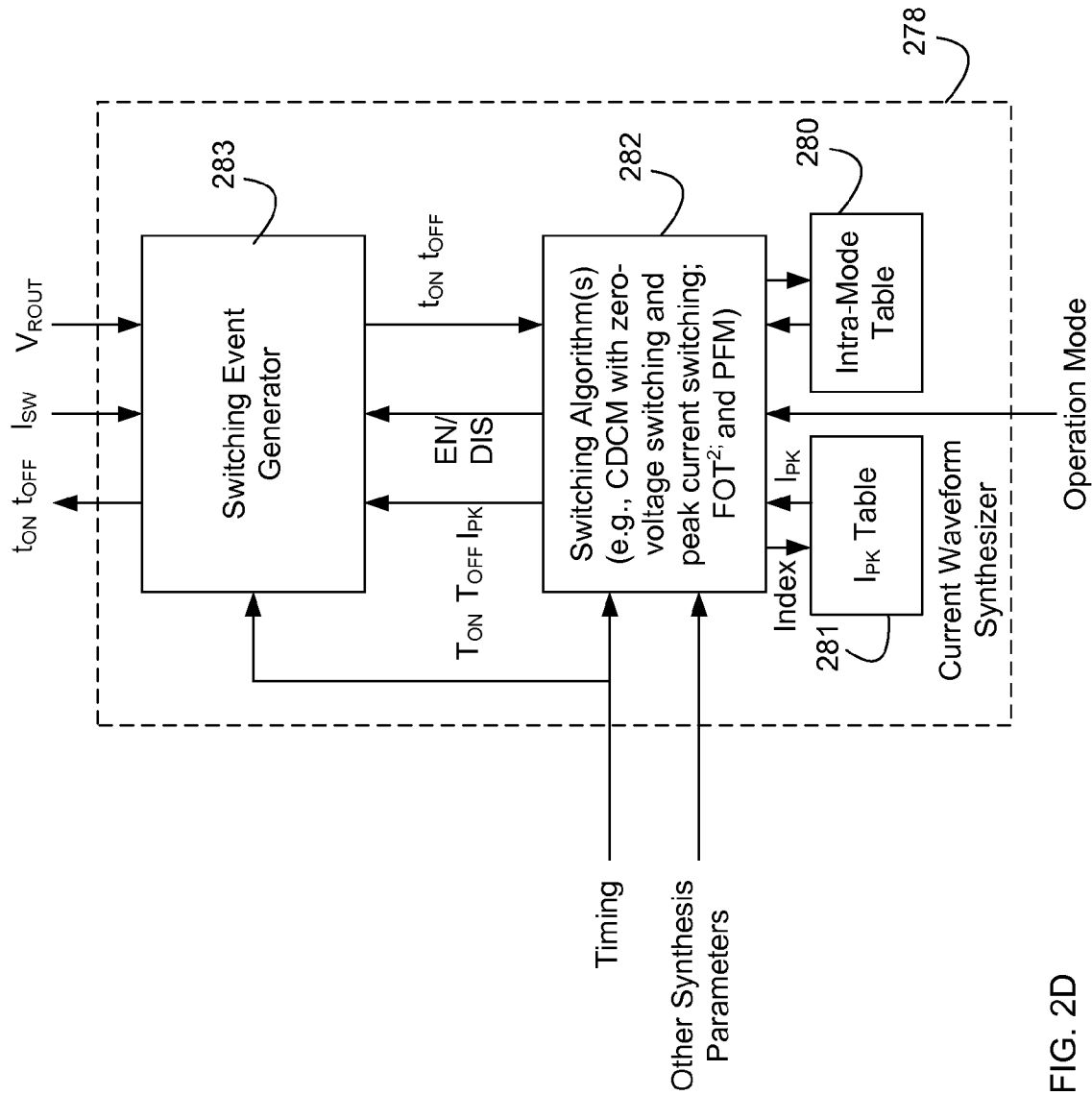
FIG. 2D is a block diagram illustrating the current waveform synthesizer in the switch controller in FIG. 2B, according to one embodiment of the present invention.

FIG. 2D describes one embodiment of a current waveform synthesizer module 278 in the switch controller 204 in FIG. 2B. The current waveform synthesizer module 278 includes a switching event generator module 283 and a switching algorithm module 282 for critical discontinuous conduction mode (CDCM) operation, fixed on-time and fixed off-time (FOT$^2$) operation, and PFM operation. The current waveform synthesizer module 278 also includes a peak current ($I_{pk}$) table 281 and an intra-mode table 280. The peak current ($I_{pk}$) table 281 stores the values of the peak switch current ($I_{pk}$) in correspondence with the count as described in FIG. 2C, and outputs those values to the switching algorithms 282 in response to an index (e.g., count). The intra-mode table 280 is used to store the values of $T_{ON}$ and $T_{OFF}$ for use at mode-to-mode transitions.

The switching algorithm module 282 receives timing information such as the count (including C1, C2, MID, C3, and C4) in FIG. 2C, $I_{avg}$ and other synthesis parameters, and the selected operation mode. The switching algorithm module 282 also may also receive the values of the peak switch current ($I_{pk}$) from the peak current table 281. The switching algorithm module 282 uses the received information to provide the switching event generator 283 with the appropriate duration of the on-times ($T_{ON}$) and off-times ($T_{OFF}$) of the switch 207 and also enables or disables the ZVS and peak current switching circuitry in the switching event generator 283 via the EN/DIS signals. The switching algorithm module 282 synthesizes current waveforms by controlling, through the switching event generator 283, the turn-on timings ($t_{ON}$) and turn-off timings ($t_{OFF}$) of the switch 207. The switching algorithm 282 applies the timing, synthesis parameter inputs, and the feedback control signal input from the operation mode selector module 274 to realize, through the switching event generator 283, the desired peak current waveform.

The switching event generator module 283 receives inputs from the switching algorithm module 282, including signals to enable/disable zero voltage switching (the derivation of turn-on time from the reflected output voltage) and peak current switching (the derivation of turn-off time from the switch current), as well as the duration of the on-time ($T_{ON}$), the duration of the off-time ($T_{OFF}$), and peak current ($I_{pk}$). The switching event generator module 283 also processes power stage signals, including the reflected output voltage signal, $V_{ROUT}$, and the switch current measurement, $I_{SW}$. The switching event generator module 283 generates turn-on-time events (points in time at which the switch is turned on, $t_{ON}$) and turn-off-time events (points in time at which the switch is turned off, $t_{OFF}$) to turn on and turn off the switch 207 based upon input from the switching algorithm module 282. Because these turn-on-time and turn-off-time events are generated internally (within the switching event generator module), they are likewise provided to the switching algorithm module 282 to facilitate the generation of subsequent switching events.

Figure 2E:
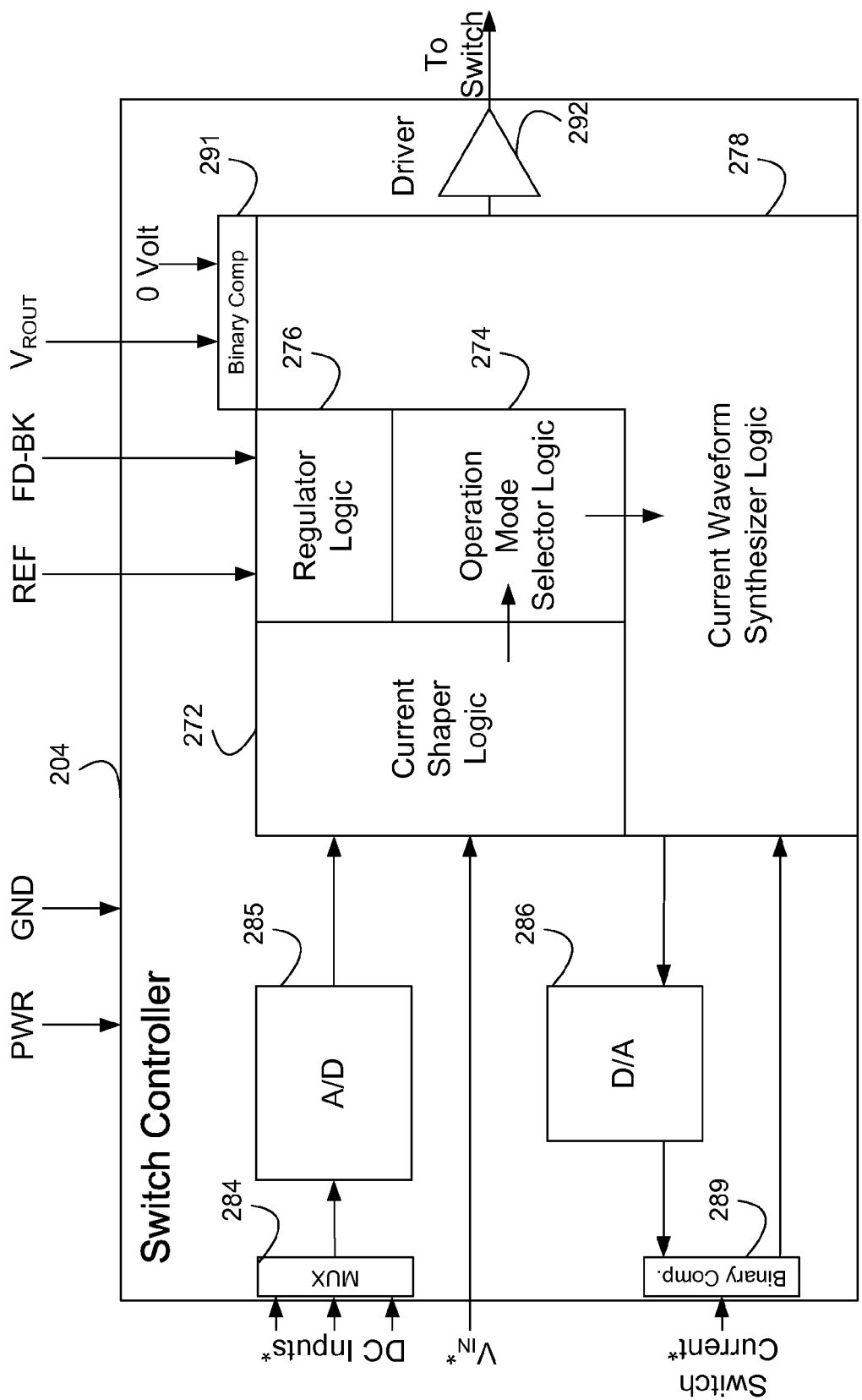
FIG. 2E is a block diagram of the switch controller in FIG. 2B, digitally implemented by programmable logic.

FIG. 2E is a block diagram of the switch controller 204 in FIG. 2B, digitally implemented by programmable logic. The switch controller 204 includes current shaper logic 272, regulator logic 276, operation mode selector logic 274, current waveform synthesizer logic 278, binary comparators 289, 291, an A/D converter 285, a D/A converter 286, and a driver 292. The switch controller receives DC inputs such as the average of the input voltage ($V_S$), NVo, and the primary inductance (L) of the transformer 206. The switch controller 204 also receives the input voltage ($V_{IN}$), the reflected output voltage ($V_{ROUT}$), the switch current ($I_{SW}$), the reference voltage (REF), and the output voltage feedback signal (FD-BK). The switch controller 204 generates control signals to control the turn-on timings ($t_{ON}$) and the turn-off timings ($t_{OFF}$) of the switch 207.

The voltage regulator logic 276 compares the output voltage feedback signal (FD-BK) to the reference voltage (REF), and generates a feedback control signal $I_{avg}$ for regulating the power converter 250. The feedback control signal $I_{avg}$ is generated to be proportional to the integral of the input current, or any other power converter signal proportional to the input current, over a predetermined period of time, regardless of the shape, form, and frequency of the input AC current. As such, the feedback control signal $I_{avg}$ may also serve as a proxy for output current through the load 214. The comparator 291 compares the reflected output voltage ($V_{ROUT}$) with 0 volts for use in zero voltage switching.

The current shaper logic 272 receives the full-wave rectified input voltage $V_{IN}$, and also receives power converter parameters including, among other things, the reference shape of peak switch current ($I_{pk}$), the winding ratios (N) of the transformer 206 used in the power converter 250, and the desired output voltage (Vo), and generates the timing information and current waveform synthesis parameters used by the operation mode selector module 274 and the current waveform synthesizer module 278. For example, the timing information includes the counts (C1, C2, MID, C3, and C4 (FIG. 2C)) corresponding to the phase of the input voltage ($V_{IN}$) that are tracked by the counter (not shown). In one embodiment, the current shaper logic 272 retrieves the appropriate counts of C1, C2, MID, C3, and C4 from a look-up table, once the frequency of the input voltage $V_{IN}$ is determined. The current waveform synthesis parameters include $I_S$ (defined as $I_{pk}$ when $V_{IN}=V_S$ and P=Po (rated output power)), $I_P$ (defined as $I_S \times \frac{1}{2}$), $T_{ONs}$ (defined as the duration of the on-time $T_{ON}$ of the switch 207 when $V_{IN}=V_S$ and P=Po), and $T_{OFF}$ (defined as the duration of the off-time $T_{OFF}$ of the switch 207 when $V_{IN}=V_S$ and P=Po).

The operation mode selector logic 274 receives the timing information and the current waveform synthesis parameters including $I_S$ and $I_P$ from the current shaper logic 272 and the feedback control signal $I_{avg}$ from the voltage regulator logic 276, and selects the operation mode (CDCM with peak current switching and zero voltage switching, FOT², or PFM) appropriate for the phase regions of the input voltage $V_{IN}$ as described in FIG. 2C, or the level of the load, and outputs the selected operation mode, the timing information, and waveform synthesis parameters to the current waveform synthesizer module 278. If the count is less than C1 or larger than C4 and the load is not a low load, then the operation mode selector logic 274 selects FOT² as the operation mode. If the count is between C1 and C4 and the load is not a low load, the operation mode selector logic 274 selects CDCM with peak current switching and zero voltage switching as the operation mode. The timing information includes the counts (C1, C2, MID, C3, C4). The synthesis parameters include $I_S$ and $I_P$. If the load is a low load, then the operation mode selector logic 274 selects PFM regardless of the count.

The current waveform synthesizer module 278 receives the selected operation mode, the timing information, current waveform synthesis parameters, and the feedback control signal $I_{avg}$ from the operation mode selector module 276, and synthesizes in real time the desired current waveform by controlling the turn-on timings ($t_{ON}$) and turn-off timings ($t_{OFF}$) of the switch 207 in the power stage 202. When the operation mode is FOT², the FOT² algorithm in the current waveform synthesizer logic 278 controls the switching event generator 283 to output regular spaced turn-on timings ($t_{ON}$) and turn-off timings ($t_{OFF}$) to the switch 207, since the durations of the on-time ($T_{ON}$) and off-time ($T_{OFF}$) of the switch 207 are fixed with FOT². Also, the peak current switching and zero-voltage switching circuits contained in the switching event generator 283 are disabled. When the operation mode is CDCM, peak current switching and zero voltage switching are enabled. The zero-voltage switching algorithm contained in the switching event generator 283 generates turn-on timings ($t_{ON}$) of the switch 207 based upon zero-voltage switching, and the peak current switching algorithm contained in the switching event generator 283 generates turn-off timings ($t_{OFF}$) of the switch 207 based upon peak current switching. In one embodiment, the values of the peak current ($I_{pk}$) are generated in real time by the current waveform synthesizer module 278 according to the reference shape of peak current as the count advances through 0, C1, C2, MID, C3, and C4 cyclically. In another embodiment, the peak current values ($I_{pk}$) may be retrieved from the table 281 by the current waveform synthesizer module 278. When the operation mode is PFM, the PFM algorithm 282 outputs $T_{ON}$ (fixed) and $T_{OFF}$ (variable) to the switching event generator 283 to generate turn-on timings ($t_{ON}$) and turn-off timings ($t_{OFF}$) of the switch 207.

Figure 2F:
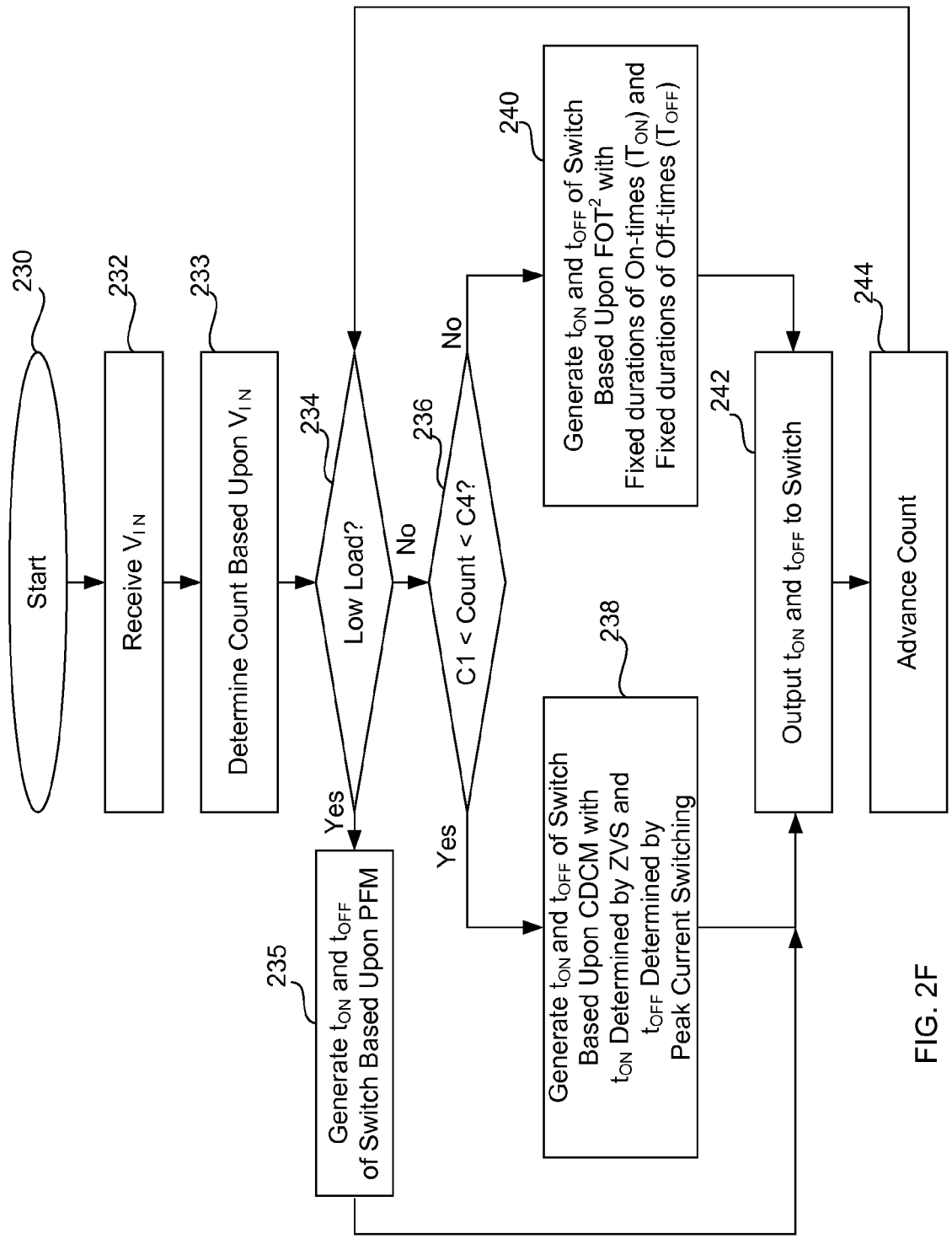
FIG. 2F is a flowchart illustrating a method of controlling the flyback power converter to synthesize the input current according to the prescribed peak current waveform of FIG. 2C, according to one embodiment of the present invention.

FIG. 2F is a flowchart illustrating a method of controlling the flyback power converter 250 to synthesize the input current according to the prescribed peak current waveform in FIG. 2C, according to one embodiment of the present invention. The method described in FIG. 2F is carried out in the switch controller 204. As the process starts 230, the switch controller 204 receives 232 the full-wave rectified input voltage $V_{IN}$ to the power converter 250 and determines 233 the count or phase of $V_{IN}$. The controller then determines 234 whether the load 214 is a low load. In one embodiment, the load 214 is determined to be a low load when the load current drops below a predetermined fraction (e.g., 25%) of a full load current. If the load 214 is a low load, the switch controller 204 generates 235 turn-on timings ($t_{ON}$) and the turn-off timings ($t_{OFF}$) of the switch 207 based upon pulse frequency modulation (PFM) and outputs 242 the generated turn-on timings ($t_{ON}$) and the turn-off timings ($t_{OFF}$) to the switch 207. If the load 214 is not a low load, the process proceeds to step 236 to determine whether the count is between C1 and C4. If the count is larger than C1 but less than C4, as described in FIG. 2C, the switch controller 204 generates 238 the turn-on timings ($t_{ON}$) and the turn-off timings ($t_{OFF}$) of the switch 207 based upon CDCM (Critical Discontinuous Continuous Mode) with the turn-on timings ($t_{ON}$) determined by ZVS (zero-voltage switching) and the turn-off timings ($t_{OFF}$) determined by peak current switching (i.e., the switch turned off when the switch current $I_{SW}$ reaches the reference shape of peak current at the count). If the count is less than C1 or larger than C4, as described in FIG. 2C, the switch controller 204 generates 240 the turn-on timings ($t_{ON}$) and the turn-off timings ($t_{OFF}$) of the switch 207 based upon FOT² (Fixed On-time and Fixed Off-time) with the durations of both the on-times ($T_{ON}$) and off-times ($T_{OFF}$) of the switch 207 fixed. The switch controller 204 outputs 242 the generated turn-on timings ($t_{ON}$) and the turn-off timings ($t_{OFF}$) to the switch 207, and advances 244 the count. Then, the process returns to step 234.

Figure 3A:
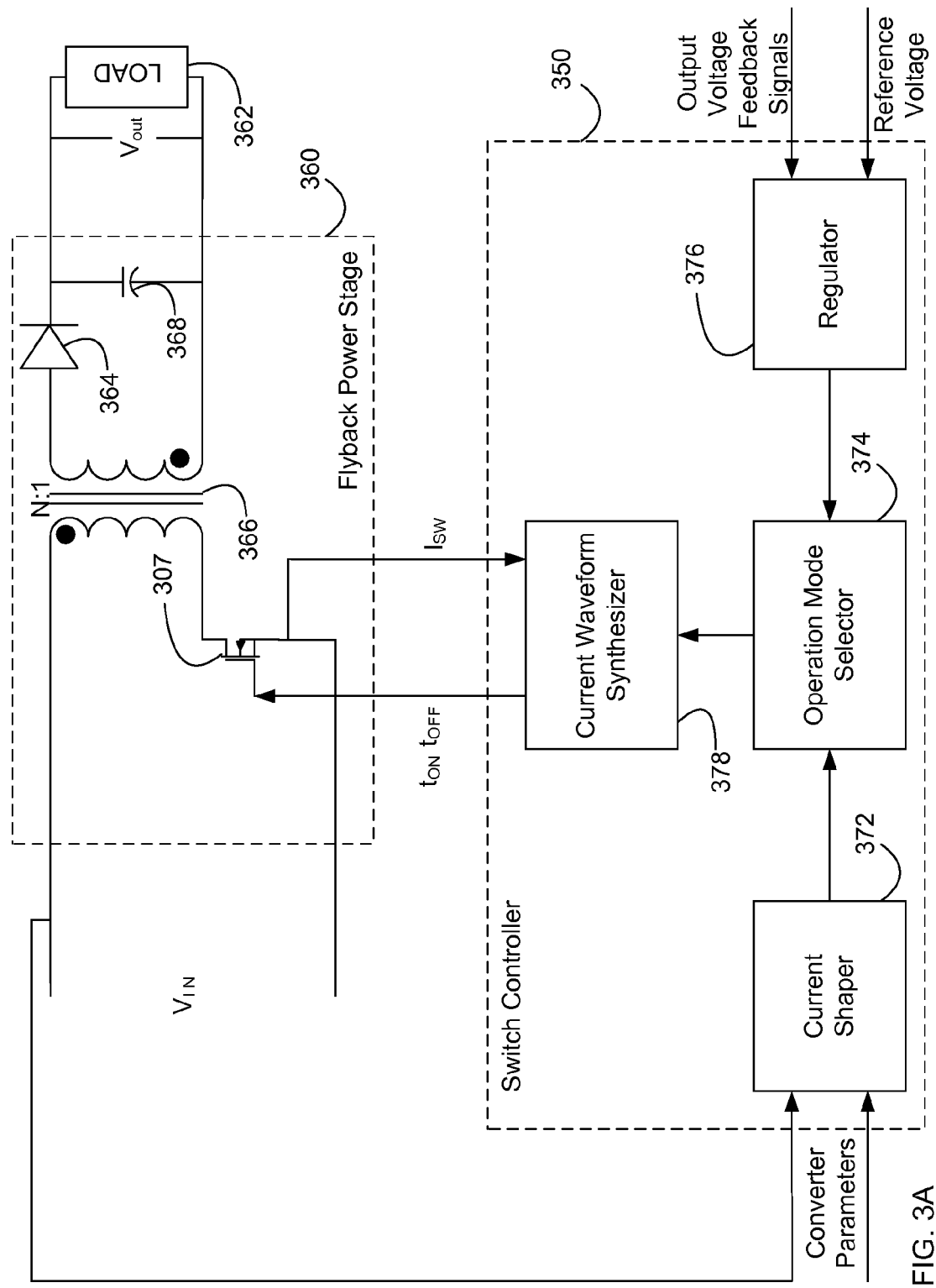
FIG. 3A is a block diagram illustrating a single-stage flyback power converter, operated in a plurality of modes including continuous conduction mode with peak current switching and shaped off-time switching, according to another embodiment of the present invention.
Figure 3B:
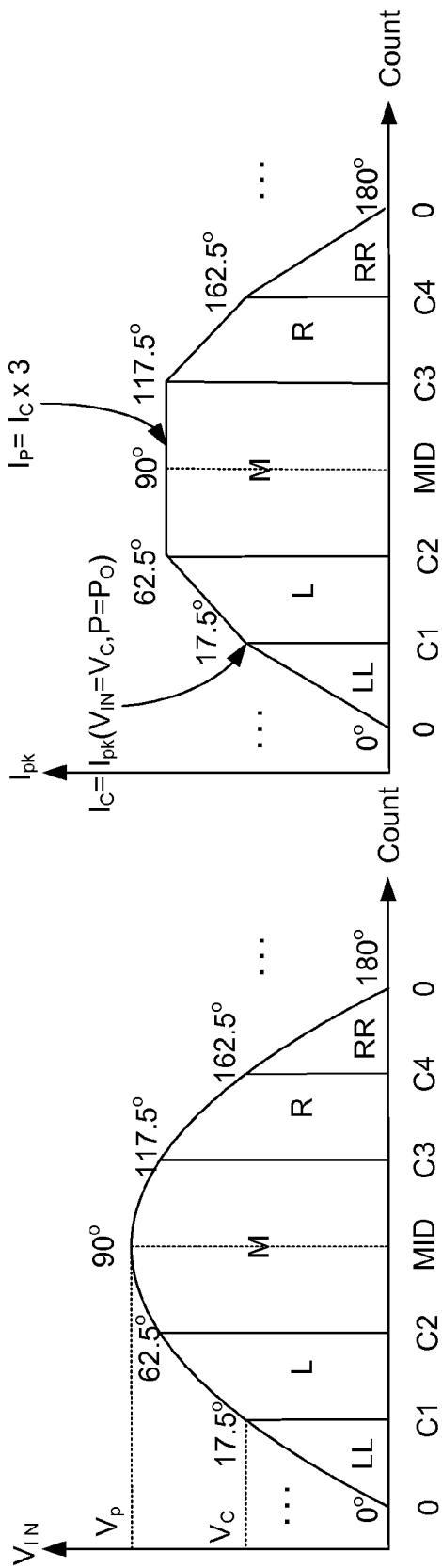
FIG. 3B are graphs illustrating the input voltage ($V_{IN}$), the reference shape of peak switch current ($I_{pk}$), and the reference shape of the off-times ($T_{OFF}$) of the switch, and the phase ranges defining the different operation modes used by the switch controller of FIG. 3A to control the power stage.
Figure 3B:
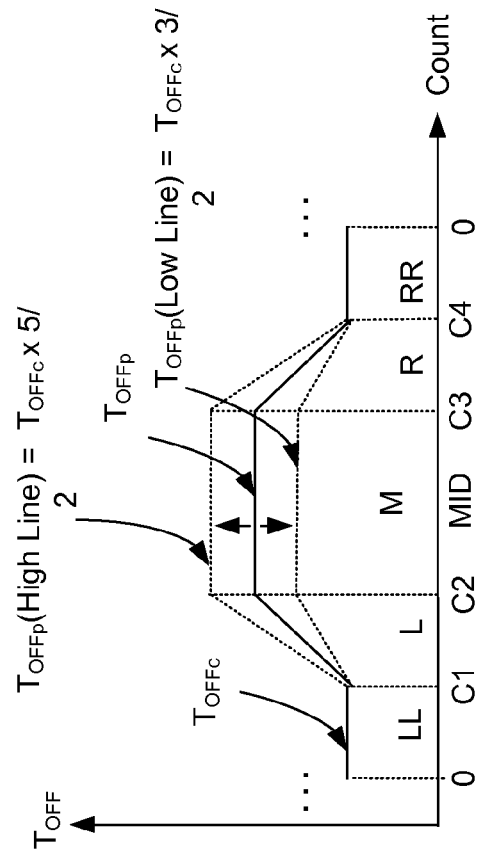

FIG. 3A is a block diagram illustrating a single-stage flyback power converter, operated in a plurality of modes including continuous conduction mode (CCM) with peak current switching and shaped off-time switching, according to another embodiment of the present invention. The power converter of FIG. 3A is similar to the power converter 250 shown in FIG. 2B, except that the switch controller 350 (including the current shaper 372, operation mode selector 374, and the current waveform synthesizer 378) is configured to operate in CCM with peak current switching and shaped off-time switching, or in FOT², depending upon the phase of the input voltage as illustrated in FIG. 3B, or in PFM if the load 362 is a low load. The power converter of FIG. 3A is operated in CCM to increase the power delivered to the load 362 without increasing the switch current.

FIG. 3B are graphs illustrating the input voltage ($V_{IN}$), the reference shape of peak switch current ($I_{pk}$), the reference shape of the off-times ($T_{OFF}$) of the switch 207, and the phase ranges defining the different operation modes (switching modes) used by switch controller 350 in FIG. 3A to control the power stage 360. The switch controller 350 controls the switch current $I_{SW}$ through the switch 307 not to exceed the reference shape of peak switch current $I_{pk}$ at any instant, by turning off the switch 307 when the switch current $I_{SW}$ reaches the reference shape of peak switch current $I_{pk}$ at the corresponding count ("peak current switching") and by turning on the switch 307 when the duration ($T_{OFF}$) of the off-time of the switch 307 reaches the reference shape of the off-time ($T_{OFF}$) of the switch 307 at the corresponding count ("shaped off-time switching"). The reference shape of the peak switch current $I_{pk}$ is a trapezoidal approximation of a sinusoidal waveform, phase coherent with the input voltage $V_{IN}$. Because the trapezoidal waveform is but an approximation to the sinusoidal waveform of $V_{IN}$, the power converter of FIG. 3A trades off slightly reduced power factor in favor of precise output current limits.

Referring to FIG. 3B, $V_{IN}$, $I_{pk}$, and $T_{OFF}$ are divided into five regions, LL (0-C1 between 0°-17.5°), L (C1-C2 between 17.5°-62.5°), M (C2-C3 between 62.5°-117.5°), R (C3-C4 between 117.5°-162.5°), and RR (C4-0 between 162.5°-180°), as measured by counts C1, C2, MID, C3, and C4 of a counter (not shown). The counter starts at 0 and resets to 0 once it passes C4 and reaches 180 degrees. As shown in FIG. 3B, the reference shape of peak switch current $I_{pk}$ has a shape of a trapezoidal approximation of a sinusoidal waveform, increasing substantially linearly from 0 to $I_C$ at a first rate when the count is between 0 and C1, increasing substantially linearly from $I_C$ to $I_P$ a second rate when the count is between C1 and C2, being constant at $I_P$ when the count is between C2 and C3, decreasing substantially linearly from $I_P$ to $I_C$ at a third rate when the count is between C3 and C4, and decreasing substantially linearly from $I_C$ to 0 at a fourth rate when the count is between C4 and 0. The duration of the off-time ($T_{OFF}$) is constant at $T_{OFFc}$ when the count is lower than C1 or larger than C4, increases substantially linearly when the count is between C1 and C2, is constant at $T_{OFFp}$ when the count is between C2 and C3, and decreases substantially linearly when the count is between C3 and C4. $I_C$ is defined as the value of $I_{pk}$ when $V_{IN}$ equals $V_C$ (½×average of $V_{IN}$) and the output power equals the rated output power $P_0$. The peak value $I_p$ is defined as $I_C$×3. $T_{OFFc}$ is defined as the value of $T_{OFF}$ when $V_{IN}$ equals $V_C$ and the output power equals the rated output power $P_0$. $T_{OFFp}$ varies linearly with average line voltage, ranging from $T_{OFFc}$×⅖ at high line to $T_{OFFc}$×⅗ at low line.

When the load 362 exceeds a predetermined fraction (e.g., 0.25) of a full load, the switch controller 350 controls the switch differently in three of the phase ranges, i.e., when the count is between 0 and C1, when the count is between C1 and C4, and when the count is between C4 and 0. In phase ranges LL and RR, the switch controller 350 controls the power stage 360 in FOT² with fixed durations of on-times ($T_{ON}$) and off-times ($T_{OFF}$) of the switch 307. In phase ranges L, M, and R, the switch controller 350 controls the power stage 360 in Continuous Conduction Mode (CCM), where the turn-on timings ($t_{ON}$) of the switch 307 are determined by shaped off-time switching and the turn-off timings ($t_{OFF}$) of the switch 307 are determined by peak current switching. Shaped off-time switching means that the switch 307 is kept off until the off-time ($T_{OFF}$) of the switch reaches the reference shape of the off-time of the switch shown in FIG. 3B at the corresponding count, at which point the switch 307 is turned on. Peak current switching means that the switch 307 is kept on until the switch current $I_{SW}$ reaches the reference shape of peak switch current $I_{pk}$, at which point the switch 307 is turned off. Since the switch current $I_{SW}$ is turned off according to the reference shape of the peak switch current $I_{pk}$, the switch current $I_{SW}$ (and implicitly, the input current to the power converter) will be shaped by the reference shape of the peak switch current. In this embodiment, a trapezoidal approximation of a sinusoidal waveform is used as reference shape of peak switch current, as shown in FIG. 3B.

When the load 362 (FIG. 3A) drops below a predetermined fraction (e.g., 25%) of full load, the switch controller 350 controls the power stage 360 with PFM.

Figure 3C:
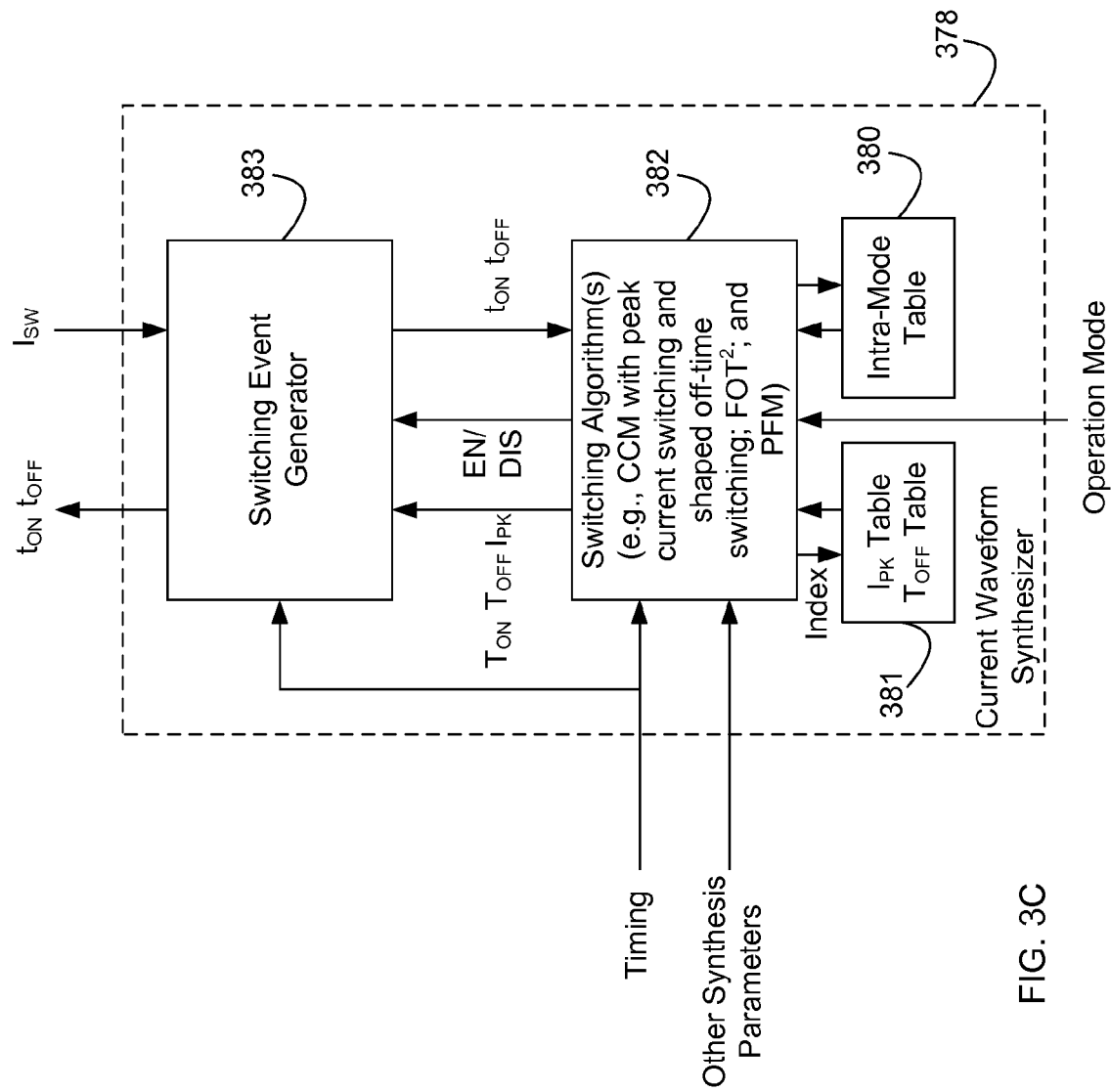
FIG. 3C is a block diagram illustrating the current waveform synthesizer in the switch controller in FIG. 3A, according to one embodiment of the present invention.

FIG. 3C is a block diagram illustrating the current waveform synthesizer 378 in the switch controller in FIG. 3A, according to one embodiment of the present invention. The current waveform synthesizer module 378 includes a switching event generator module 383 and a switching algorithm module 382 for continuous conduction mode (CCM) operation with peak current switching and shaped off-time switching, FOT² operation, and PFM operation. The current waveform synthesizer module 378 also includes a peak current ($I_{pk}$) and off-time ($T_{OFF}$) table 381 and an intra-mode table 380. The peak current ($I_{pk}$) and off-time ($T_{OFF}$) table 381 stores the values of the peak switch current ($I_{pk}$) and off-time ($T_{OFF}$) for the corresponding counts as described in FIG. 3C and outputs the appropriate peak switch current ($I_{pk}$) and off-time ($T_{OFF}$) values in response to an index (e.g., count). The intra-mode table 380 is used to store the values of $T_{ON}$ and $T_{OFF}$ for use at mode-to-mode transitions.

The switching algorithm module 382 receives timing information such as the counts (including C1, C2, MID, C3, C4), $I_{avg}$, and other synthesis parameters such as $I_C$, $I_P$, $T_{OFFc}$, and $T_{OFFp}$ in FIG. 3B. The switching algorithm module 382 may also receive the values of the peak switch current ($I_{pk}$) and off-time ($T_{OFF}$) from the peak current ($I_{pk}$) and off-time ($T_{OFF}$) table 381. The switching algorithm module 382 uses the received information to provide the switching event generator 383 with the appropriate duration of the on-times ($T_{ON}$) and off-times ($T_{OFF}$) of the switch 307 and also enables or disables the peak current switching circuitry in the event generator 383 via the EN/DIS signals. The switching algorithm module 382 synthesizes current waveforms by controlling, through the switching event generator 383, the turn-on timings ($t_{ON}$) and turn-off timings ($t_{OFF}$) of the switch 307. The switching algorithm module 382 applies the timing, synthesis parameter inputs, and the feedback control signal input from the operation mode selector module 374 to realize, through the switching event generator 383, the desired peak current waveform.

The switching event generator module 383 receives inputs from the switching algorithm module 382, including signals to enable/disable peak current switching (the derivation of turn-off time from the peak switch current), as well as the duration of the on-time ($T_{ON}$), duration of the off-time ($T_{OFF}$), and the peak current ($I_{pk}$). The switching event generator module 383 also receives the switch current measurement, $I_{SW}$. The switching event generator module 383 generates turn-on-timing events (points in time at which the switch is turned on, $t_{ON}$) and turn-off timing events (points in time at which the switch is turned off, $t_{OFF}$) to turn on and turn off the switch 307 based upon the selected operation mode. Because these turn-on-timing and turn-off-timing events are generated internally (within the switching event generator module), they are likewise provided to the switching algorithm module 382 to facilitate the generation of subsequent switching events.

Figure 3D:
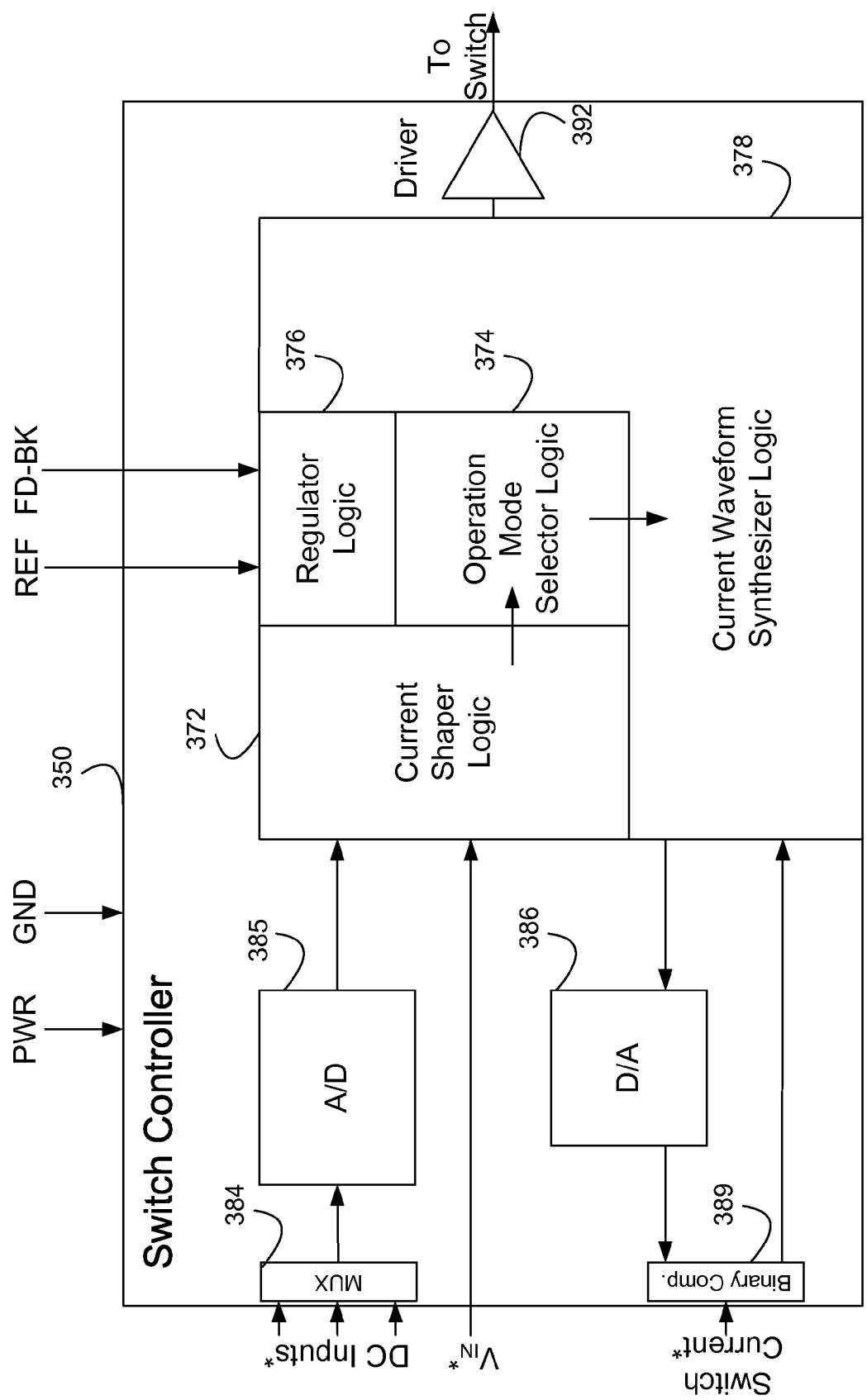
FIG. 3D is a block diagram of the switch controller in FIG. 3A, digitally implemented by programmable logic.

FIG. 3D is a block diagram of the switch controller 350 in FIG. 3A, digitally implemented by programmable logic. The switch controller 350 includes current shaper logic 372, regulator logic 376, operation mode selector logic 374, current waveform synthesizer logic 378, binary comparator 389, a multiplexer 384, an A/D converter 385, a D/A converter 386, and a driver 392. The switch controller 350 receives DC inputs such as the average of the input voltage ($V_S$), NVo, and the primary inductance (L) of the transformer 366. The switch controller 350 also receives the input voltage ($V_{IN}$), the switch current ($I_{SW}$), the reference voltage (REF), and the output voltage feedback signal (FD-BK). The switch controller 350 generates control signals to control the duration of turn-on timings and the turn-off timings of the switch 307.

The voltage regulator logic 376 compares the output voltage feedback signal (FD-BK) to the reference voltage (REF), and generates a feedback control signal $I_{avg}$ for regulating the power converter. The feedback control signal $I_{avg}$ is generated to be proportional to the integral of the input current, or any other power converter signal proportional to the input current, over a predetermined period of time, regardless of the shape, form, and frequency of the input AC current. As such, the feedback control signal $I_{avg}$ may also serve as a proxy for output current through the load 362. Besides generating the feedback control signal $I_{avg}$, the voltage regulator module 376 also detects sudden changes in the load 362 and signals them to the operation mode selector logic 374.

The current shaper logic 372 receives the full-wave rectified input voltage $V_{IN}$, and also receives power converter parameters including, among other things, the reference shape of the peak switch current ($I_{pk}$), the reference shape of the off-times ($T_{OFF}$), the winding ratios (N) of the transformer 366 used in the power converter 350, and the desired output voltage (Vo), and generates the timing information and current waveform synthesis parameters used by the operation mode selector module 374 and the current waveform synthesizer module 378. For example, the timing information includes the counts C1, C2, MID, C3, and C4 (FIG. 3B) corresponding to the phase of the input voltage $V_{IN}$ that is tracked by the counter (not shown). In one embodiment, the current shaper logic 372 retrieves the appropriate values of C1, C2, MID, C3, and C4 from a look-up table, once the frequency of the input voltage $V_{IN}$ is determined. The current waveform synthesis parameters include $I_C$ (defined as $I_{pk}$ when $V_{IN}=V_C$ and P=Po (rated output power)), $I_P$ (defined as $I_S \times 3$), $T_{ONc}$ (defined as the duration of the on-time $T_{ON}$ of the switch 307 when $V_{IN}=V_c$ and P=Po), and $T_{OFFc}$ (defined as the duration of the off-time $T_{OFF}$ of the switch 307 when $V_{IN}=V_C$ and P=Po).

The operation mode selector logic 374 receives the timing information and the current waveform synthesis parameters from the current shaper logic 372 and the feedback control signal $I_{avg}$ from the voltage regulator logic 376, and selects the operation mode (CCM with peak current switching and shaped off-time switching, $FOT^2$, or PFM) appropriate for the phase regions of the input voltage $V_{IN}$ as described in FIG. 3B, or the level of the load, and outputs the selected operation mode, the timing information, and waveform synthesis parameters to the current waveform synthesizer module 378. If the count is less than C1 or larger than C4 and the load 362 is not a low load, then the operation mode selector logic 374 selects $FOT^2$ with fixed on-time and fixed off-time as the operation mode. If the count is between C1 and C4 and the load 362 is not a low load, the operation mode selector logic 374 selects CCM with peak current switching and shaped off-time switching as the operation mode. The timing information includes the counts C1, C2, MID, C3, C4. The synthesis parameters include $I_C$, $I_P$, $T_{OFFc}$, and $T_{OFFp}$. If the load 362 is a low load, then operation mode selector logic 374 selects PFM regardless of the count.

The current waveform synthesizer module 378 receives the selected operation mode, the timing information, current waveform synthesis parameters, and the feedback control signal $I_{avg}$ from the operation mode selector module 376, and synthesizes in real time the desired current waveform by controlling the turn-on timings ($t_{ON}$) and turn-off timings ($t_{OFF}$) of the switch 307 in the power stage 360. When the operation mode is $FOT^2$, the $FOT^2$ algorithm in the current waveform synthesizer logic 378 controls the switching event generator 383 to output regular spaced turn-on timings ($t_{ON}$) and turn-off timings ($t_{OFF}$) to the switch 307, since the durations of the on-time ($T_{ON}$) and off-time ($T_{OFF}$) of the switch 307 are fixed with $FOT^2$. Also, the peak current switching and shaped off-time switching circuits contained in the switching event generator 383 are disabled. When the operation mode is CCM, peak current switching and shaped off-time switching are enabled. The shaped off-time switching algorithm in the current waveform synthesizer logic 378 controls the switching event generator 383 to generate turn-on timings ($t_{ON}$) of the switch 307 when the duration of the off-times ($T_{OFF}$) of the switch 307 reaches the reference shape of the off-times corresponding to the phase of $V_{IN}$. The peak current switching algorithm in the current waveform synthesizer logic 378 controls the switching event generator 383 to generate turn-off timings ($t_{OFF}$) of the switch 307 when the current reaches the reference shape of peak current corresponding to the phase of $V_{IN}$. In one embodiment, the values of the peak current ($I_{pk}$) and the shaped off-times ($T_{OFF}$) are generated in real time by the current waveform synthesizer module 378 according to the reference shapes of peak current and off-time, respectively, as the count advances through 0, C1, C2, MID, C3, and C4 cyclically. In another embodiment, the values of the peak current ($I_{pk}$) and the shaped off-times ($T_{OFF}$) are retrieved by the current waveform synthesizer module 378 from table 381. When the operation mode is PFM, the PFM algorithm in the current waveform synthesizer logic 378 outputs $T_{ON}$ (fixed) and $T_{OFF}$ (variable) to the switching event generator 383 to generate turn-on timings ($t_{ON}$) and turn-off timings ($t_{OFF}$) of the switch 307 based upon PFM.

Figure 3E:
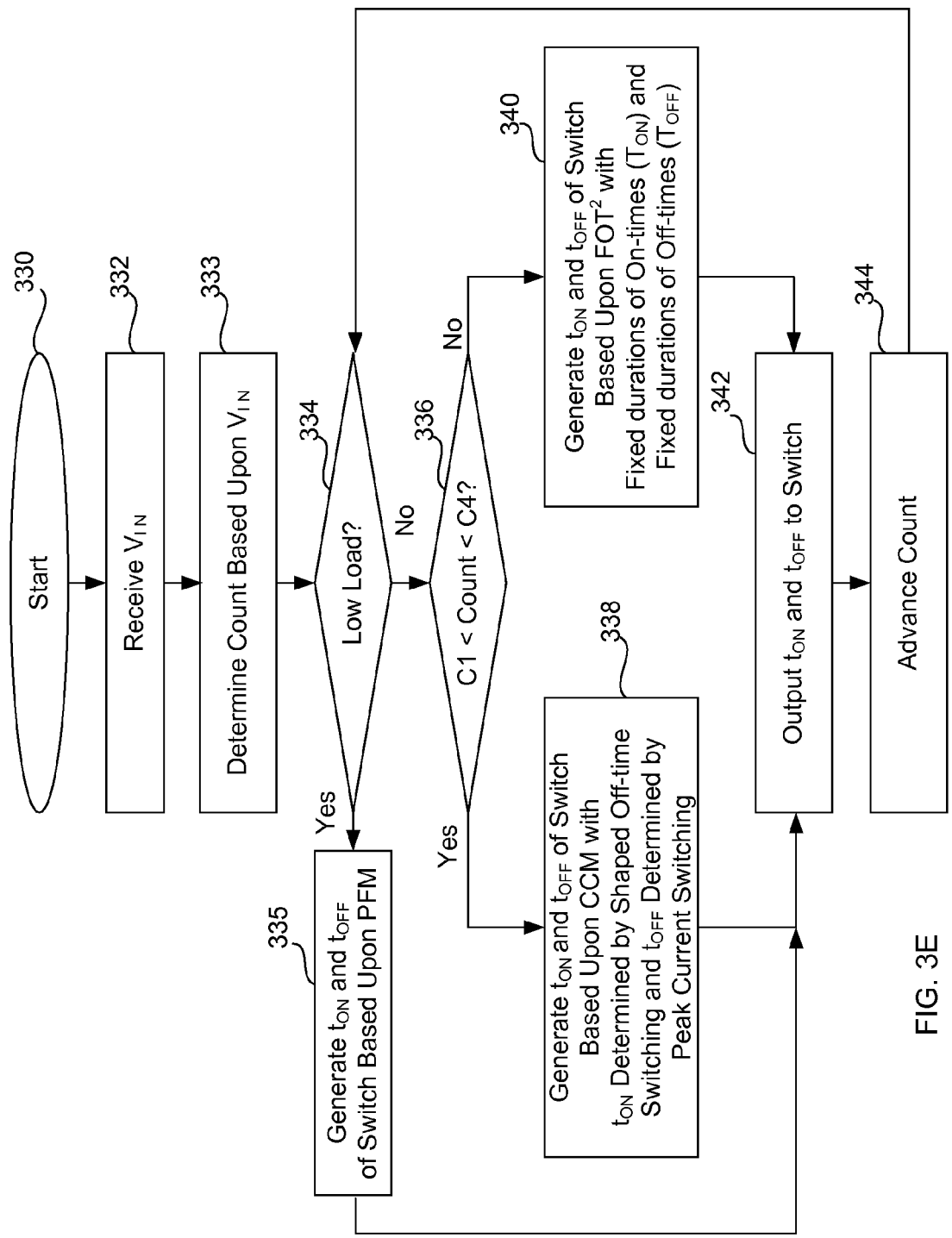
FIG. 3E is a flowchart illustrating a method of controlling the flyback power converter to synthesize the input current according to the prescribed waveform of FIG. 3B, according to one embodiment of the present invention.

FIG. 3E is a flowchart illustrating a method of controlling the flyback power converter to synthesize the input current according to the prescribed waveform of FIG. 3B, according to one embodiment of the present invention. The method described in FIG. 3E is carried out in the switch controller 350. As the process starts 330, the switch controller 350 receives 332 the full-wave rectified input voltage $V_{IN}$ to the power converter and establishes 333 the count, or phase of $V_{IN}$. The switch controller 350 then determines 334 whether the load 362 is a low load. In one embodiment, the load is determined to be a low load when the load current drops below a predetermined fraction (e.g., 0.25) of a full load current. If the load is a low load, then the switch controller 350 generates 335 the turn-on timings ($t_{ON}$) and the turn-off timings ($t_{OFF}$) of the switch 307 based upon pulse frequency modulation (PFM), and outputs the generated timings to the switch 307. If the load 362 is not a low load, then the switch controller 350 determines 336 whether the count is between C1 and C4. As described in FIG. 3B, the count corresponds to certain phase ranges of the input voltage $V_{IN}$. If the count is larger than C1 but less than C4 336, as described in FIG. 3B, the switch controller 350 generates 338 the turn-on timings ($t_{ON}$) and the turn-off timings ($t_{OFF}$) of the switch 307 based upon CCM (Continuous Conduction Mode) with the turn-on timings ($t_{ON}$) determined by shaped off-time switching. If the count is less than C1 or larger than C4, as described in FIG. 3B, the switch controller 350 generates 340 the turn-on timings ($t_{ON}$) and the turn-off timings ($t_{OFF}$) of the switch 307 based upon FOT$^2$ (fixed on-times and fixed off-times) with the durations of both the on-times ($T_{ON}$) and off-times ($T_{OFF}$) of the switch 307 fixed. The switch controller 350 outputs 342 the generated turn-on timings ($t_{ON}$) and the turn-off timings ($t_{OFF}$) to the switch 307, and advances 344 the count. Then, the process returns to step 334.

Figure 4A:
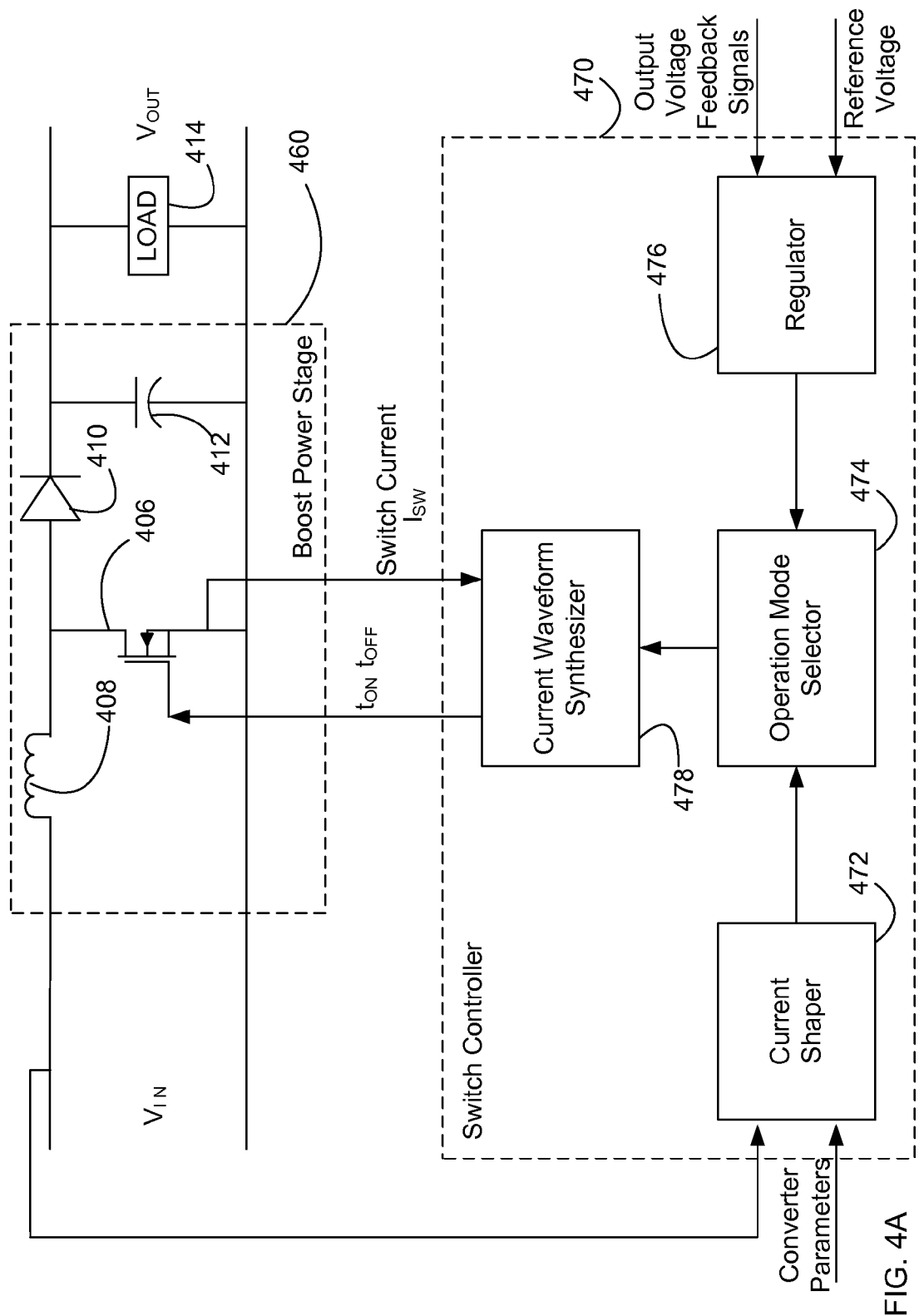
FIG. 4A is a block diagram illustrating a boost power converter, operated in a plurality of modes including continuous conduction mode with peak current switching and shaped off-time switching, according to another embodiment of the present invention.

FIG. 4A is a block diagram illustrating a single-stage boost power converter, operated under a plurality of modes including continuous conduction mode with peak current switching and shaped off-time switching, according to another embodiment of the present invention. The boost power converter of FIG. 4A is used to deliver power in excess of that available from flyback power converters operating in continuous conduction mode. The power converter of FIG. 4A includes a boost power stage 460 and a switch controller 470. The boost power stage 460 includes a boost inductor 408, a switch 406, a diode 410, and a capacitor 412. The switch controller 470 is similar to the switch controller 350 in the power converter shown in FIG. 3A, except that the switch controller 470 (including the current shaper 472, operation mode selector 474, and the current waveform synthesizer 478) is configured to operate in CCM with peak current switching and shaped off-time switching, regardless of the timing corresponding to the phase of the input voltage as illustrated in FIG. 3B absent a low load condition. The boost power converter of FIG. 4A is operated in CCM to increase the power delivered to the load 414 without increasing the switch current.

Figure 4B:
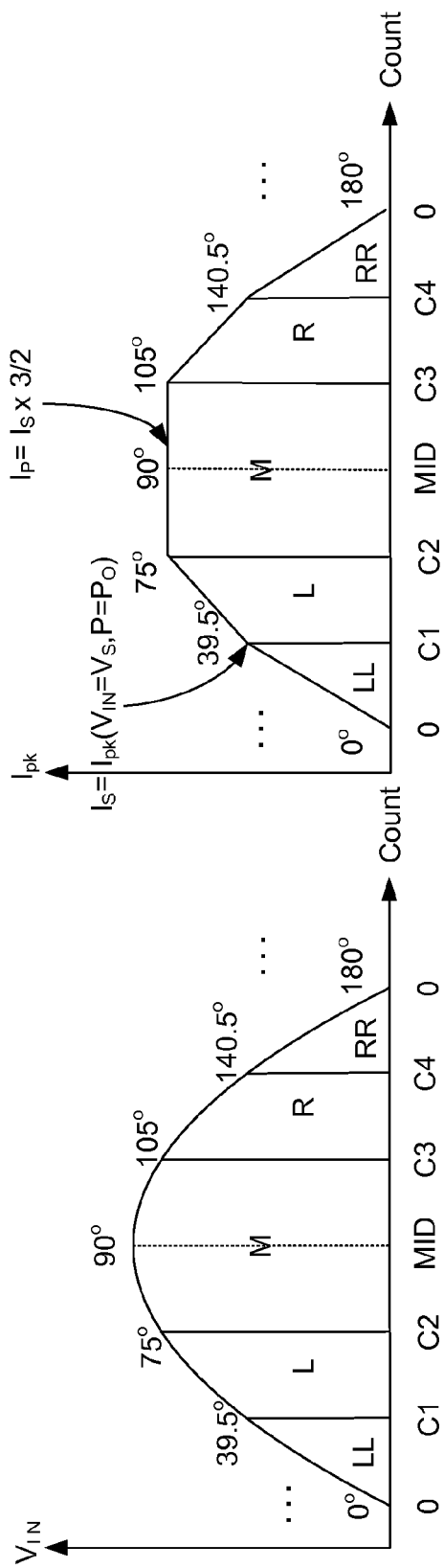
FIG. 4B are graphs illustrating the input voltage ($V_{IN}$), the reference shape of peak switch current ($I_{pk}$), the reference shape of the off-times ($T_{OFF}$) of the switch, and the phase ranges defining the different operation modes used by the switch controller of FIG. 4A to control the power stage.
Figure 4B:
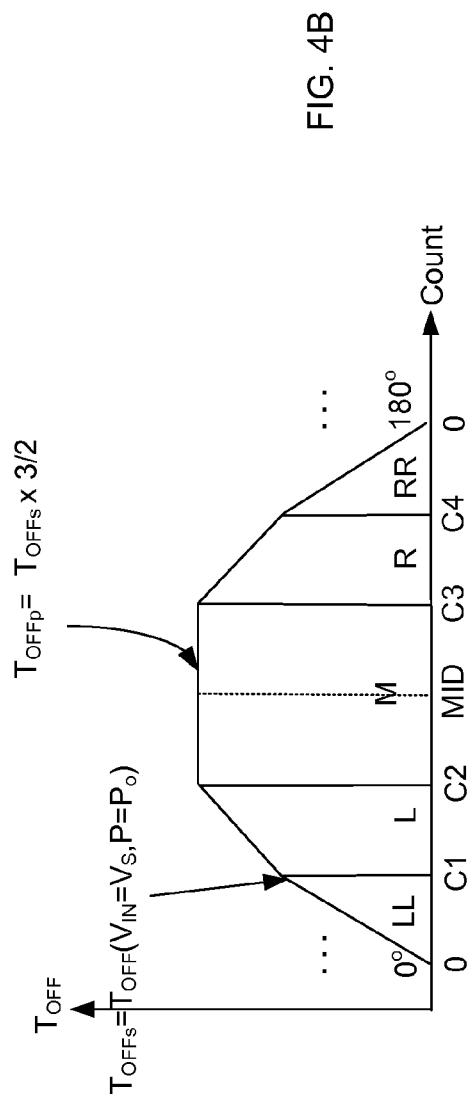

FIG. 4B are graphs illustrating the input voltage ($V_{IN}$), the reference shape of peak switch current ($I_{pk}$), the reference shape of off-times ($T_{OFF}$) of the switch 406. The switch controller 470 controls the switch current $I_{SW}$ through the switch 406 not to exceed the reference shape of peak switch current $I_{pk}$ at any instant, by turning off the switch 406 when the switch current $I_{SW}$ reaches the reference shape of peak switch current $I_{pk}$ at the corresponding count, and by turning on the switch 406 when the duration of the off-time of the switch 406 reaches the reference shape of off-time ($T_{OFF}$) at the corresponding count. The reference shape of peak switch current $I_{pk}$ is a trapezoidal approximation of a sinusoidal waveform, phase coherent with the input voltage $V_{IN}$. Because the trapezoidal shape is but an approximation to the sinusoidal waveform of $V_{IN}$, the power converter of FIG. 4A trades off slightly reduced power factor in favor of precise output current limits.

Referring to FIG. 4B, $V_{IN}$, $I_{pk}$, and $T_{OFF}$ are divided into five regions, LL (0-C1 between 0°-39.5°), L (C1-C2 between 39.5°-75°), M (C2-C3 between 75°-105°), R (C3-C4 between 105°-140.5°), and RR (C4-0 between 140.5°-180°), as measured by counts C1, C2, MID, C3, and C4 of a counter (not shown). The counter starts at 0 and resets to 0 once it passes C4 and reaches 180 degrees. As shown in FIG. 4B, the reference shape of peak current $I_{pk}$ has the shape of a trapezoidal approximation of a sinusoidal waveform, increasing substantially linearly from 0 to $I_S$ at a first rate when the count is between 0 and C1, increasing substantially linearly from $I_S$ to $I_P$ at a second rate when the count is between C1 and C2, being constant at $I_P$ when the count is between C2 and C3, decreasing substantially linearly from $I_P$ to $I_S$ at a third rate when the count is between C3 and C4, and decreasing substantially linearly from $I_S$ to 0 at a fourth rate when the count is between C4 and 0. The reference shape of the off-time ($T_{OFF}$) also has the shape of a trapezoid, increasing substantially linearly fro 0 to $T_{OFFs}$ at a first rate when the count is between 0 and C1, increasing substantially linearly at a second rate when the count is between C1 and C2, is constant at $T_{OFFp}$ when the count is between C2 and C3, decreases substantially linearly at a third rate when the count is between C3 and C4, and decreases substantially linearly at a fourth rate when the count is between C4 and 0. $I_S$ is defined as the value of $I_{pk}$ when $V_{IN}$ equals $V_S$ (the average of $V_{IN}$) and the output power equals the rated output power $P_0$. The peak value $I_p$ is defined as $I_S \times 3/2$. $T_{OFFs}$ is defined as the value of $T_{OFF}$ when $V_{IN}$ equals $V_S$ and the output power equals the rated output power $P_0$ $T_{OFFp}$ is defined as $T_{OFFs} \times 3/2$.

When the load 414 exceeds a predetermined fraction (e.g., 0.25) of a full load, the switch controller 470 controls the power stage 460 in Continuous Conduction Mode (CCM) regardless of the count, where the turn-on timings ($t_{ON}$) of the switch 406 are determined by shaped off-time switching and the turn-off timings ($t_{OFF}$) of the switch 406 are determined by peak current switching. Shaped off-time switching means that the switch 406 will be kept off until the off-time of the switch reaches the reference shape of the off-time ($T_{OFF}$) of the switch shown in FIG. 4B at the count corresponding, at which point the switch 406 is turned on. Peak current switching means that the switch 406 will be kept on until the switch current $I_{SW}$ reaches the reference shape of peak switch current $I_{pk}$, at which point the switch 406 is turned off. Since the switch current $I_{SW}$ is turned off according to the reference shape of the peak switch current $I_{pk}$, the switch current $I_{SW}$ (and implicitly, the input current to the power converter) will be shaped by the reference shape of the peak switch current. In this embodiment, a trapezoidal approximation of a sinusoidal waveform is used as the reference shape of peak switch current, as shown in FIG. 4B.

When the load 414 (FIG. 4A) drops below a predetermined fraction (e.g., 25%) of full load, the switch controller 470 controls the power stage 460 with PFM.

Figure 4C:
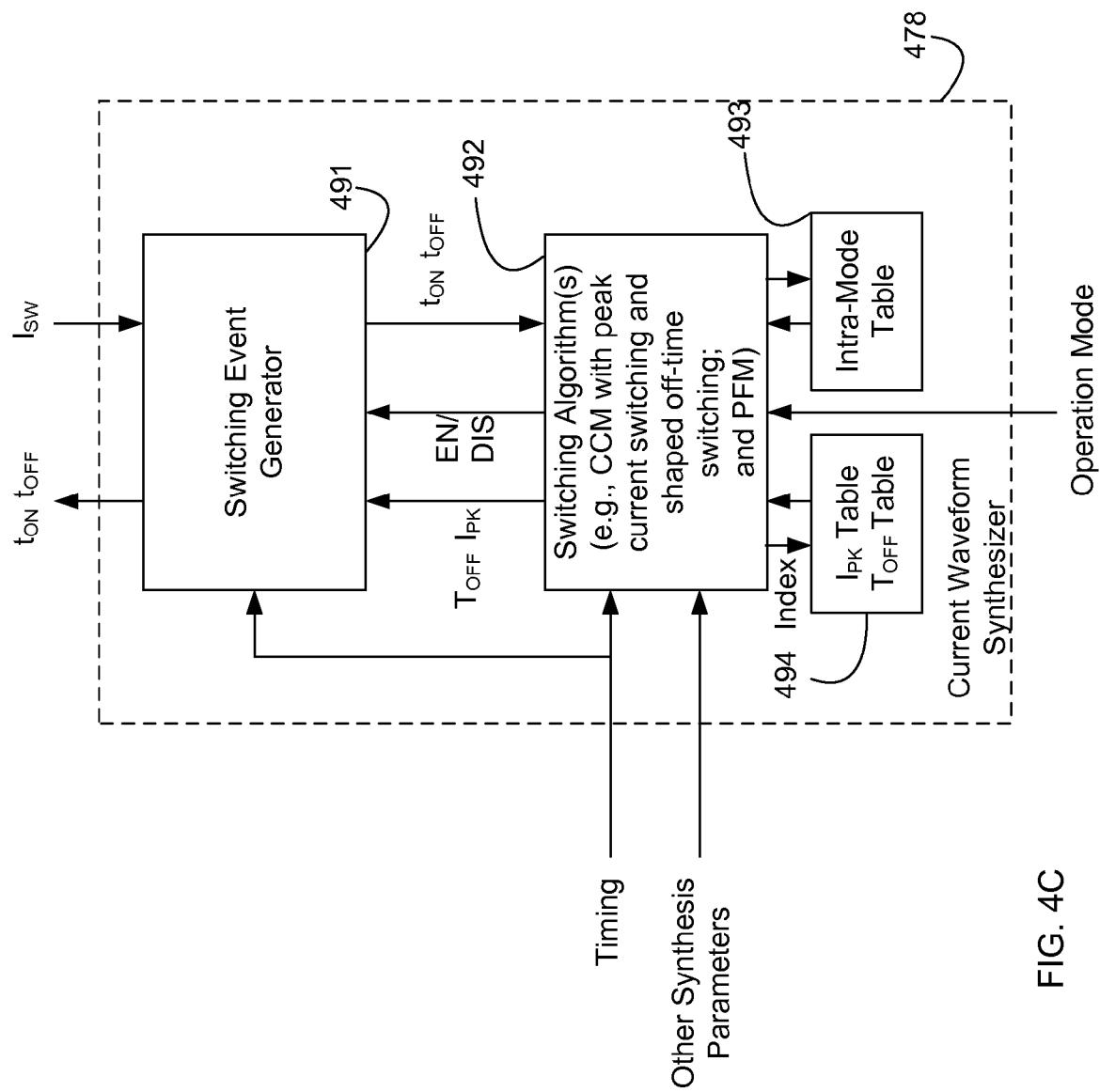
FIG. 4C is a block diagram illustrating the current waveform synthesizer in the switch controller in FIG. 4A, according to one embodiment of the present invention.

FIG. 4C is a block diagram illustrating the current waveform synthesizer 478 in the switch controller in FIG. 4A, according to one embodiment of the present invention. The current waveform synthesizer module 478 includes a switching event generator module 491 and a switching algorithm module 492 for continuous conduction mode (CCM) operation with peak current switching and shaped off-time switching, and PFM operation. The current waveform synthesizer module 478 also includes a peak current ($I_{pk}$) and off-time ($T_{OFF}$) table 494 and an intra-mode table 493. The peak current ($I_{pk}$) and off-time ($T_{OFF}$) table 494 stores the values of the peak switch current ($I_{pk}$) and off-time ($T_{OFF}$) for the corresponding counts as described in FIG. 4B and outputs the appropriate peak switch current ($I_{pk}$) and off-time ($T_{OFF}$) values in response to an index (e.g., count). The intra-mode table is used to store the values of $T_{ON}$ and $T_{OFF}$ for use at mode-to-mode transitions.

The switching algorithm module 492 receives timing information such as the count (including C1, C2, MID, C3, C4), $I_{avg}$, and other synthesis parameters such as $I_S$, $I_P$, $T_{OFFs}$, and $T_{OFFp}$ in FIG. 4B. The switching algorithm module 492 may also receive the values of the peak switch current ($I_{pk}$) and off-time ($T_{OFF}$) from the peak current and off-time table 494. The switching algorithm module 492 uses the received information to provide the switching event generator 491 with the appropriate duration of the on-times ($T_{ON}$) and off-times ($T_{OFF}$) of the switch 406 and also enables or disables the peak current switching circuitry in the event generator 491 via the EN/DIS signals. The switching algorithm module 492 synthesizes current waveforms by controlling, through the switching event generator 491, the turn-on timings ($t_{ON}$) and turn-off timings ($t_{OFF}$) of the switch 406. The switching algorithm module 492 applies the timing, synthesis parameter inputs, and the feedback control signal input from the operation mode selector module 474 to realize, through the switching event generator 491, the desired peak current waveform.

The switching event generator module 491 receives inputs from the switching algorithm module 492, including signals to enable/disable peak current switching (the derivation of turn-off time from the peak switch current), as well as the duration of the on-time ($T_{ON}$), duration of the off-time ($T_{OFF}$), and the peak current ($I_{pk}$). The switching event generator module 491 also receives the switch current measurement, $I_{SW}$. The switching event generator module 491 generates turn-on-timing events (points in time at which the switch is turned on, $t_{ON}$) and turn-off-timing events (points in time at which the switch is turned off, $t_{OFF}$) to turn on and turn off the switch 406 based upon the selected operation mode. Because these turn-on-timing and turn-off-timing events are generated internally (within the switching event generator module 491), they are likewise provided to the switching algorithm module 492 to facilitate the generation of subsequent switching events.

Figure 4D:
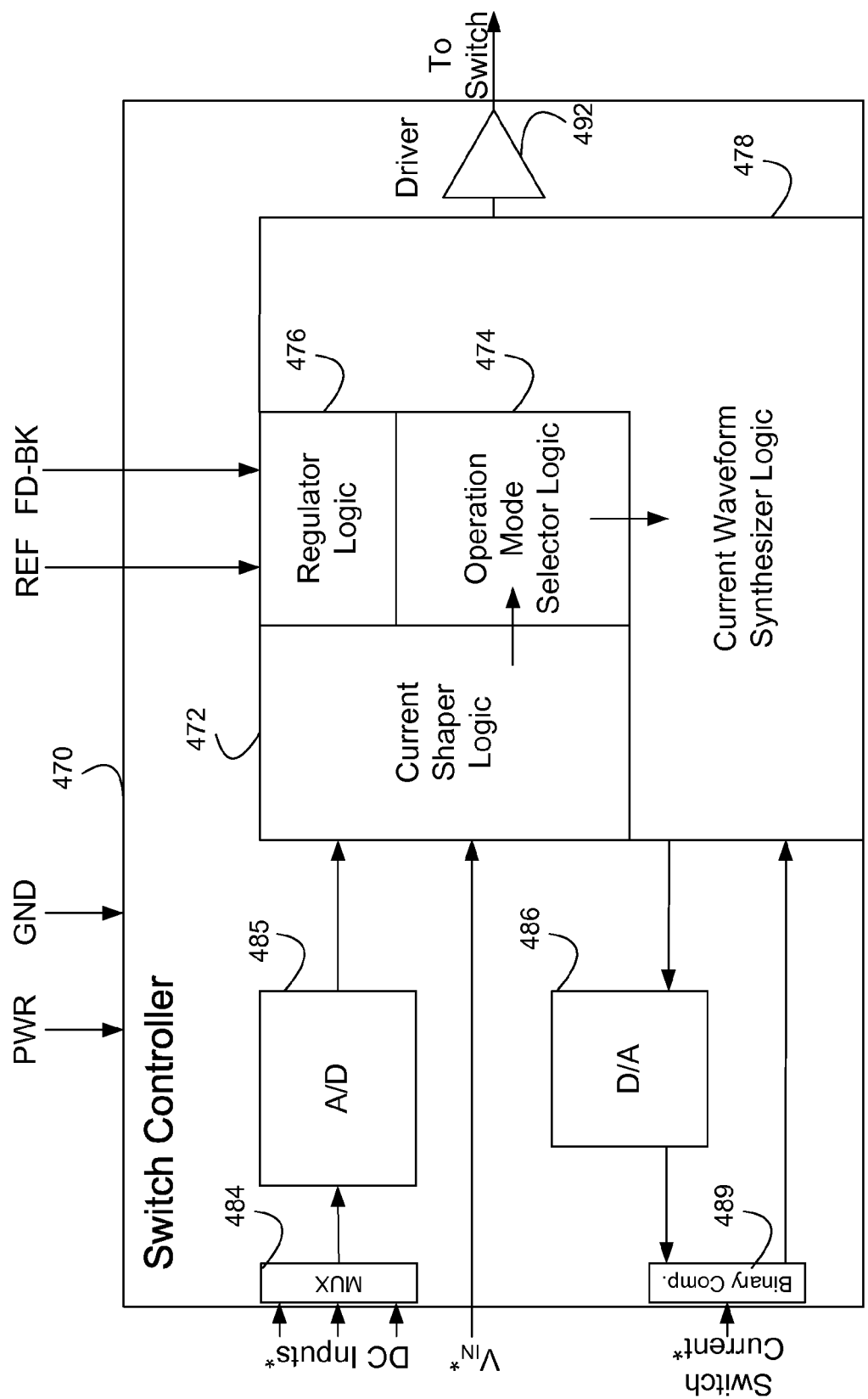
FIG. 4D is a block diagram of the switch controller in FIG. 4A, digitally implemented by programmable logic.

FIG. 4D is a block diagram of the switch controller 470 in FIG. 4A, digitally implemented by programmable logic. The switch controller 470 includes current shaper logic 472, regulator logic 476, operation mode selector logic 474, current waveform synthesizer logic 478, binary comparator 489, a multiplexer 484, an A/D converter 485, a D/A converter 486, and a driver 492. The switch controller 470 receives DC inputs such as the average of the input voltage ($V_S$), the rated output power $P_0$ of the boost converter, and the inductance (L) of the boost inductor 408. The switch controller 470 also receives the input voltage ($V_{IN}$), the switch current ($I_{SW}$), the reference voltage (REF) and the output voltage feedback signal (FD-BK). The switch controller 470 generates control signals to control the turn-on-timings and the turn-off-timings of the switch 406.

The voltage regulator logic 476 compares the output voltage feedback signal (FD-BK) to the reference voltage (REF), and generates a feedback control signal $I_{avg}$ for regulating the power converter. The feedback control signal $I_{avg}$ is generated to be proportional to the integral of the input current, or any other power converter signal proportional to the input current, over a predetermined period of time, regardless of the shape, form, and frequency of the input AC current. As such, the feedback control signal $I_{avg}$ may also serve as a proxy for output current through the load 414. Besides generating the feedback control signal $I_{avg}$, the voltage regulator module 476 also detects sudden changes in the load 414 and signals them to the operation mode selector 474.

The current shaper logic 472 receives the full-wave rectified input voltage $V_{IN}$, and also receives power converter parameters including, among other things, the reference shape of the peak current ($I_{pk}$), the reference shape of the off-times ($T_{OFF}$), the desired output voltage (Vo), and the boost inductance (L), and generates the timing information and current waveform synthesis parameters used by the operation mode selector logic 474 and the current waveform synthesizer module 478. For example, the timing information includes the counts C1, C2, MID, C3, and C4 (FIG. 4B) corresponding to the phase of the input voltage $V_{IN}$ that is tracked by the counter (not shown). In one embodiment, the current shaper logic 472 retrieves the appropriate values of C1, C2, MID, C3, and C4 from a look-up table, once the frequency of the input voltage $V_{IN}$ is determined. The current waveform synthesis parameters include $I_S$ (defined as $I_{pk}$ when $V_{IN}=V_S$ and P=Po (rated output power)), $I_P$ (defined as $I_S \times \frac{3}{2}$), $T_{ON_s}$ (defined as the duration of the on-time $T_{ON}$ of the switch 406 when $V_{IN}=V_S$ and P=Po), and $T_{OFF_s}$ (defined as the duration of the off-time $T_{OFF}$ of the switch 406 when $V_{IN}=V_S$ and P=Po).

The operation mode selector logic 474 receives the timing information and the current waveform synthesis parameters from the current shaper logic 472 and the feedback control signal $I_{avg}$ from the voltage regulator logic 476, and selects the operation mode (CCM with peak current switching and shaped off-time switching, or PFM) appropriate for the level of the load, and outputs the selected operation mode, the timing information, and waveform synthesis parameters to the current waveform synthesizer logic 478. If the load 414 is not a low load, the operation mode selector logic 474 selects CCM with peak current switching and shaped off-time switching as the operation mode, regardless of the count. The timing information includes the counts C1, C2, MID, C3, C4. The synthesis parameters include $I_S$, $I_P$, $T_{OFF_s}$, and $T_{OFF_p}$. If the load 414 is a low load, then the operation mode selector logic 474 selects PFM regardless of the count.

The current waveform synthesizer module 478 receives the selected operation mode, the timing information, current waveform synthesis parameters, and the feedback control signal $I_{avg}$ from the operation mode selector logic 476, and synthesizes in real time the desired current waveform by controlling the turn-on timings ($t_{ON}$) and turn-off timings ($t_{OFF}$) of the switch 406 in the power stage 460. When the operation mode is CCM, peak current switching and shaped off-time switching are enabled. The shaped off-time switching algorithm in the current waveform synthesizer logic 478 controls the switching event generator 491 to generate turn-on timings ($t_{ON}$) of the switch 406 when the duration of the off-times ($T_{OFF}$) of the switch 406 reaches the reference shape of the off-times corresponding to the phase of $V_{IN}$, and the peak current switching algorithm in the current waveform synthesizer logic 478 controls the switching event generator 491 to generate turn-off timings ($t_{OFF}$) of the switch 406 when the current reaches the reference shape of peak current corresponding to the phase of $V_{IN}$. In one embodiment, the values of the peak current ($I_{pk}$) and the shaped off-times ($T_{OFF}$) are generated in real time by the current waveform synthesizer module 478 according to the reference shapes of peak current and off-time, respectively, as the count advances through 0, C1, C2, MID, C3, and C4 cyclically. In another embodiment, the values of the peak current ($I_{pk}$) and the shaped off-time ($T_{OFF}$) are retrieved by the current waveform synthesizer module 478 from table 494. When the operation mode is PFM, the PFM algorithm in the current waveform synthesizer logic 478 outputs $T_{ON}$ (fixed) and $T_{OFF}$ (variable) to the switching event generator 491 to generate turn-on timings ($t_{ON}$) and turn-off timings ($t_{OFF}$) of the switch 406 based upon PFM.

Figure 4E:
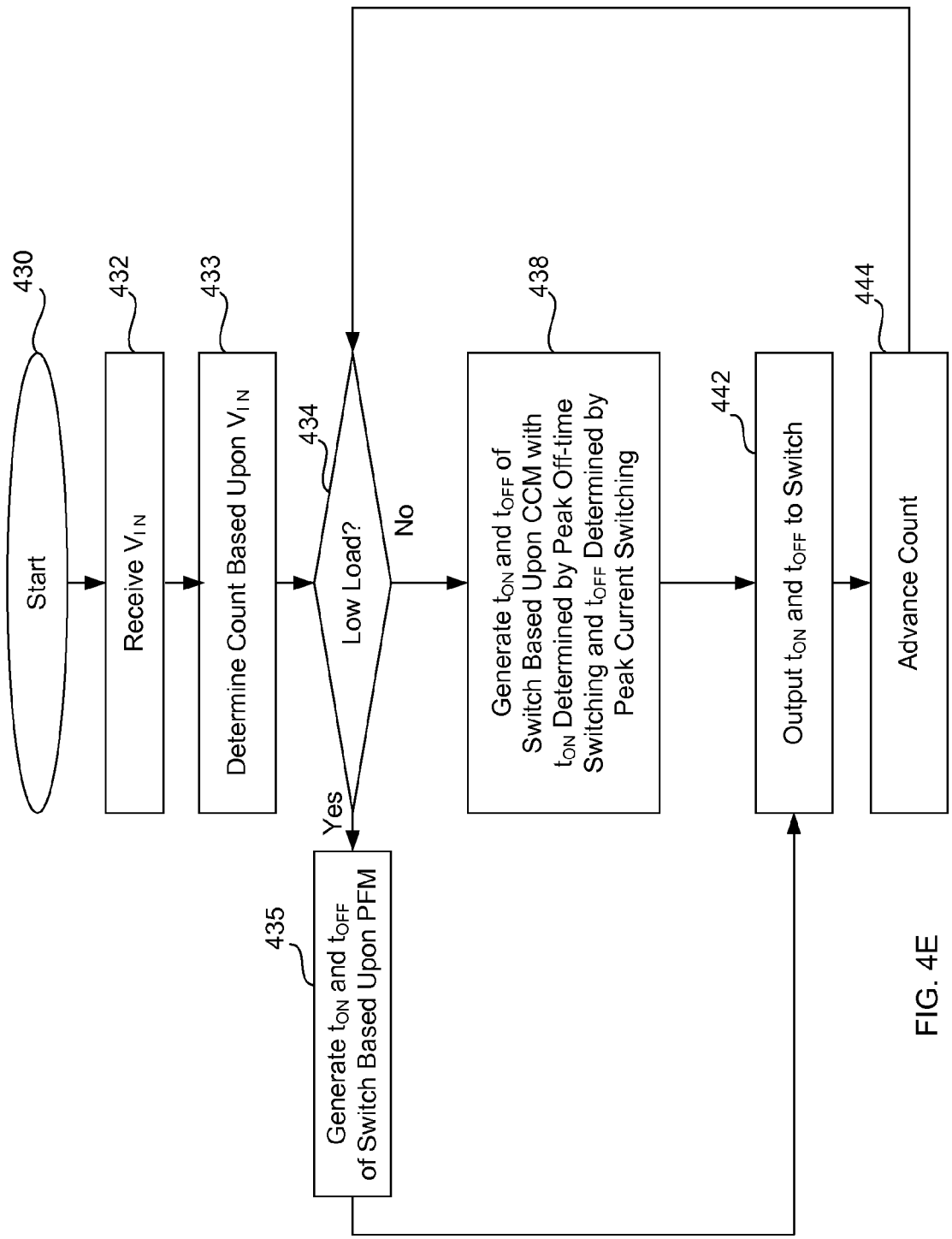
FIG. 4E is a flowchart illustrating a method of controlling the boost power converter to synthesize the input current according to the prescribed waveform of FIG. 4B, according to one embodiment of the present invention.

FIG. 4E is a flowchart illustrating a method of controlling the boost power converter to synthesize the input current according to the prescribed waveform of FIG. 4B, according to one embodiment of the present invention. The method described in FIG. 4E is carried out in the switch controller 470. As the process starts 430, the switch controller 470 receives 432 the full-wave rectified input voltage $V_{IN}$ to the power converter and establishes 433 the count, or phase of $V_{IN}$. Controller 470 then determines 434 whether the load 414 is a low load. In one embodiment, the load is determined to be a low load when the load current drops below a predetermined fraction (e.g., 0.25) of a full load current.

If the load is a low load, then the switch controller 470 generates 435 the turn-on timings ($t_{ON}$) and the turn-off timings ($t_{OFF}$) of the switch 406 based upon pulse frequency modulation (PFM), and outputs 442 the generated timings to the switch 406. If the load 362 is not a low load, the switch controller 470 generates 438 the turn-on and turn-off timings of the switch 406 based upon CCM with the turn-on timings determined by shaped off-time switching, and the turn-off timings determined by peak current switching. The switch controller 470 outputs 442 the generated turn-on timings ($t_{ON}$) and turn-off timings ($t_{OFF}$) to the switch 406, and advances 444 the count. Then, the process returns to step 434.

Although the present invention has been described above with respect to several embodiments, various modifications can be made within the scope of the present invention. For example, the peak current switching mode or the shaped off-time switching mode of the present invention may be used with any type of power converters to shape the input current. Different shapes of the peak switch current ($I_{pk}$) or the off-times ($T_{OFF}$) of the switch may be used with the power converter of the present invention, besides the trapezoidal approximations of sinusoids as described herein. Operation/switching modes different from what are described herein may be used. Also, the phase regions of the input voltage $V_{IN}$ may be divided in a manner different from what is described herein.

Accordingly, the disclosure of the present invention is intended to be illustrative, but not limiting, of the scope of the invention, which is set forth in the following claims.

What is claimed is:

1. A method of shaping input current to a flyback-type AC to DC power converter based upon a reference shape of peak current values, the method comprising:

receiving an input voltage signal to the power converter;

determining a count corresponding to a phase of the input voltage signal, the count corresponding to one of at least a first range, a second range, and a third range of the phase of the input voltage signal;

responsive to determining that the count corresponds to the second range of the phase of the input voltage signal, determining turn-on timings and turn-off timings of a switch in the flyback-type power converter based upon one or more operation modes, at least one of the operation modes being a peak current switching mode that determines the turn-off timings of the switch so as to keep the switch on until a current through the switch reaches the peak current value corresponding to the determined count at which time the switch is turned off; and controlling the switch to be turned on and off based upon the determined turn-on timings and the determined turn-off timings, respectively.

2. The method of claim 1, wherein the peak current value is derived from a table storing a plurality of the peak current values corresponding to the reference shape.

3. The method of claim 1, wherein the peak current value is generated in real time, based upon the determined count and the reference shape.

4. The method of claim 1, further comprising:

receiving a reflected voltage on an auxiliary winding of a transformer in the flyback-type power converter as a proxy for an output voltage of the flyback-type power converter;

responsive to determining that the count corresponds to the second range of the phase of the input voltage signal, determining the turn-on timings of the switch based upon a zero voltage switching mode, the zero voltage switching mode determining the turn-on timings of the switch so as to keep the switch off until the reflected voltage falls to zero at which time the switch is turned on.

5. The method of claim 1, further comprising:

responsive to determining that the count corresponds to the first range or the third range of the phase of the input voltage signal, determining the turn-on timings of the switch so as to keep the switch off for a first predetermined fixed duration and determining the turn-off timings of the switch so as to keep the switch on for a second predetermined fixed duration.

6. The method of claim 1, wherein the reference shape of the peak current values comprises a trapezoid formed by the peak current values corresponding to a first count, a second count higher than the first count, a third count higher than the second count, a fourth count higher than the third count, a fifth count higher than the fourth count, and a sixth count higher than the fifth count, and wherein:

the first range includes the counts from the first count to the second count;

the second range includes the counts from the second count to the fifth count;

the third range includes the counts from the fifth count to the sixth count, the counts being reset at the sixth count to be same as the first count; and the peak current values increase substantially linearly from zero to a first peak current value at a first rate when the count is between the first count and the second count, increase substantially linearly from the first peak current value to a second peak current value at a second rate when the count is between the second count and the third count, is constant at the second peak current value when the count is between the third count and the fourth count, decreases substantially linearly from the second peak current value to the first peak current value at a third rate when the count is between the fourth count and the fifth count, and decreases substantially linearly from the first peak current value to zero at a fourth rate when the count is between the fifth count and the six count.

7. The method of claim 6, wherein:

the input voltage signal is a full-wave rectified AC voltage signal having a phase range of 0 to 180 degrees; and the first count, the second count, the third count, the fourth count, the fifth count, and the sixth count correspond to phases of 0 degrees, 39.5 degrees, 75 degrees, 105 degrees, 140.5 degrees, and 180 degrees, respectively, of the full-wave rectified AC voltage signal.

8. The method of claim 6, wherein the second peak current value is equal to ³⁄₂ of the first peak current value.

9. The method of claim 1, further comprising:

determining whether a load coupled to the power converter is a low load; and responsive to determining that the load is a low load, determining the turn-on timings and the turn-off timings of the switch based upon pulse frequency modulation.

10. A flyback-type AC to DC power converter, comprising:

a flyback power stage for transferring electrical power received in the form of an AC input voltage signal from a power source to a load;

a switch in the power stage that electrically couples or decouples the load to or from the power source; and a switch controller coupled to the switch for shaping input current to the power converter based upon a reference shape of peak current values, wherein the switch controller:
  determines a count corresponding to a phase of the AC input voltage signal, the count corresponding to one of at least a first range, a second range, and a third range of the phase of the input voltage signal;
  responsive to determining that the count corresponds to the second range of the phase of the input voltage signal, determines turn-on timings and turn-off timings of the switch based upon one or more operation modes, at least one of the operation modes being a peak current switching mode that determines the turn-off timings of the switch so as to keep the switch on until a current through the switch reaches the peak current value corresponding to the determined count at which time the switch is turned off; and
  controls the switch to be turned on and off based upon the determined turn-on timings and the determined turn-off timings, respectively.

11. The flyback-type AC to DC power converter of claim 10, wherein the switch controller derives the peak current value from a table storing a plurality of the peak current values corresponding to the reference shape.

12. The flyback-type AC to DC power converter of claim 10, wherein the switch controller generates the peak current value in real time, based upon the determined count and the reference shape.

13. The flyback-type AC to DC power converter of claim 10, wherein the switch controller:
  receives a reflected voltage on an auxiliary winding of a transformer in the power converter as a proxy for an output voltage of the flyback-type power converter; and
  responsive to determining that the count corresponds to the second range of the phase of the input voltage signal, determines the turn-on timings of the switch based upon a zero voltage switching mode, the zero voltage switching mode determining the turn-on timings of the switch so as to keep the switch off until the reflected voltage falls to zero at which time the switch is turned on.

14. The flyback-type AC to DC power converter of claim 10, wherein the switch controller:
  responsive to determining that the count corresponds to the first range or the third range of the phase of the input voltage signal, determines the turn-on timings of the switch so as to keep the switch off for a first predetermined fixed duration and determines the turn-off timings of the switch so as to keep the switch on for a second predetermined fixed duration.

15. The flyback-type AC to DC power converter of claim 10, wherein the reference shape of the peak current values comprises a trapezoid formed by the peak current values corresponding to a first count, a second count higher than the first count, a third count higher than the second count, a fourth count higher than the third count, a fifth count higher than the fourth count, and a sixth count higher than the fifth count, and wherein:
  the first range includes the counts from the first count to the second count;
  the second range includes the counts from the second count to the fifth count;
  the third range includes the counts from the fifth count to the six count, the counts being reset at the sixth count to be same as the first count; and
  the peak current values increase substantially linearly from zero to a first peak current value at a first rate when the count is between the first count and the second count, increase substantially linearly from the first peak current value to a second peak current value at a second rate when the count is between the second count and the third count, is constant at the second peak current value when the count is between the third count and the fourth count, decreases substantially linearly from the second peak current value to the first peak current value at a third rate when the count is between the fourth count and the fifth count, and decreases substantially linearly from the first peak current value to zero at a fourth rate when the count is between the fifth count and the six count.

16. The flyback-type AC to DC power converter of claim 15, wherein:
  the input voltage signal is a full-wave rectified AC voltage signal having a phase range of 0 to 180 degrees; and
  the first count, the second count, the third count, the fourth count, the fifth count, and the sixth count correspond to phases of 0 degrees, 39.5 degrees, 75 degrees, 105 degrees, 140.5 degrees, and 180 degrees, respectively, of the full-wave rectified AC voltage signal.

17. The flyback-type AC to DC power converter of claim 15, wherein the second peak current value is equal to $\tfrac{3}{2}$ of the first peak current value.

18. The flyback-type AC to DC power converter of claim 10, wherein the switch controller:
  determines whether a load coupled to the power converter is a low load; and
  responsive to determining that the load is a low load, determines the turn-on timings and the turn-off timings of the switch based upon pulse frequency modulation.

19. A controller for shaping an input current to a flyback-type AC to DC power converter, the power converter including a flyback power stage for transferring electrical power from a power source to a load and a switch in the flyback power stage that is controlled by the controller and electrically couples or decouples the load to or from the power source, the controller comprising:
  a current shaper module for determining waveform synthesis parameters based upon an AC input voltage signal and a reference shape of peak current values, and for determining a count corresponding to a phase of the AC input voltage signal, the count corresponding to one of at least a first range, a second range, and a third range of the phase of the input signal;
  an operation mode selector module receiving the waveform synthesis parameters and the count, and selecting at least one of a plurality of operation modes configured to determine turn-on timings and turn-off timings of the switch, at least one of the operation modes being a peak current switching mode configured to determine the turn-off timings of the switch so as to keep the switch on until a current through the switch reaches the peak current value corresponding to the determined count at which time the switch is turned off; and
  a current waveform synthesizer module determining the turn-on timings and turn-off timings of the switch based upon the selected operation mode and for controlling the switch in accordance with the determined turn-off timings and the determined turn-on timings of the switch, respectively.

20. The controller of claim 19, wherein the current waveform synthesizer module derives the peak current value from a table storing a plurality of the peak current values corresponding to the reference shape.

21. The controller of claim 19, wherein the current waveform synthesizer module generates the peak current value in real time, based upon the determined count and the reference shape.

22. The controller of claim 19, wherein:
the current waveform synthesizer module receives a reflected voltage on an auxiliary winding of a transformer in the power converter as a proxy for an output voltage of the flyback-type power converter; and
responsive to the current shaper module determining that the count corresponds to the second range of the phase of the input voltage signal, the operation mode selector module selecting a zero voltage switching mode, the zero voltage switching mode configured to determine the turn-on timings of the switch so as to keep the switch off until the reflected voltage falls to zero at which time the switch is turned on.

23. The controller of claim 19, wherein:
responsive to the current shaper module determining that the count corresponds to the first range or the third range of the phase of the input voltage signal, the operation mode selector module selecting a fixed on-time and fixed off-time switching mode, the fixed-on-time and fixed off-time switching mode determining the turn-on timings of the switch so as to keep the switch off for a first predetermined fixed duration and determining the turn-off timings of the switch so as to keep the switch on for a second predetermined fixed duration.

24. The controller of claim 19, wherein the reference shape of the peak current values comprises a trapezoid formed by the peak current values corresponding to a first count, a second count higher than the first count, a third count higher than the second count, a fourth count higher than the third count, a fifth count higher than the fourth count, and a sixth count higher than the fifth count, and wherein:
the first range includes the counts from the first count to the second count;
the second range includes the counts from the second count to the fifth count;
the third range includes the counts from the fifth count to the six count, the counts being reset at the sixth count to be same as the first count; and
the peak current values increase substantially linearly from zero to a first peak current value at a first rate when the count is between the first count and the second count, increase substantially linearly from the first peak current value to a second peak current value at a second rate when the count is between the second count and the third count, is constant at the second peak current value when the count is between the third count and the fourth count, decreases substantially linearly from the second peak current value to the first peak current value at a third rate when the count is between the fourth count and the fifth count, and decreases substantially linearly from the first peak current value to zero at a fourth rate when the count is between the fifth count and the six count.

25. The controller of claim 24, wherein:
the input voltage signal is a full-wave rectified AC voltage signal having a phase range of 0 to 180 degrees; and
the first count, the second count, the third count, the fourth count, the fifth count, and the sixth count correspond to phases of 0 degrees, 39.5 degrees, 75 degrees, 105 degrees, 140.5 degrees, and 180 degrees, respectively, of the full-wave rectified AC voltage signal.

26. The controller of claim 24, wherein the second peak current value is equal to ½ of the first peak current value.

27. The controller of claim 19, wherein the operation mode selector module selects a pulse frequency modulation mode for determining the turn-on timings and the turn-off timings of the switch based upon pulse frequency modulation if a load coupled to the power converter is a low load.

28. A controller for shaping an input current to a flyback-type AC to DC power converter, the power converter including a flyback power stage for transferring electrical power received in a form of input voltage signal from a power source to a load, and a switch in the power stage that is controlled by the controller and electrically couples or decouples the load to or from the power source, wherein the controller:
determines a count corresponding to a phase of the AC input voltage signal, the count corresponding to one of at least a first range, a second range, and a third range of the phase of the input voltage signal;
responsive to determining that the count corresponds to the second range of the phase of the input voltage signal, determines turn-on timings and turn-off timings of the switch based upon one or more operation modes, at least one of the operation modes being a peak current switching mode that determines the turn-off timings of the switch so as to keep the switch on until a current through the switch reaches the peak current value corresponding to the determined count at which time the switch is turned off; and
controls the switch to be turned on and off based upon the determined turn-on timings and the determined turn-off timings, respectively.

29. A method of shaping input current to a flyback-type AC to DC power converter based upon a first reference shape of peak current values and a second reference shape of peak off-time values, the method comprising:
receiving an input voltage signal to the power converter;
determining a count corresponding to a phase of the input voltage signal, the count corresponding to one of at least a first range, a second range, and a third range of the phase of the input voltage signal;
responsive to determining that the count corresponds to the second range of the phase of the input voltage signal, determining turn-on timings and turn-off timings of a switch in the flyback-type power converter based upon one or more operation modes, at least one of the operation modes being a peak current switching mode that determines the turn-off timings of the switch so as to keep the switch on until a current through the switch reaches the peak current value corresponding to the determined count at which time the switch is turned off, and at least another one of the operation modes being a shaped off-time switching mode that determines the turn-on timings of the switch so as to keep the switch off until a duration of the off-time of the switch reaches the peak off-time value corresponding to the count at which time the switch is turned on; and
controlling the switch to be turned on and off based upon the determined turn-on timings and the determined turn-off timings, respectively.

30. The method of claim 29, wherein the peak current value is derived from a first table storing a plurality of the peak current values and the peak off-time value is derived from a second table storing a plurality of the peak off-times values.

31. The method of claim 29, wherein the peak current value is generated in real time, based upon the determined count and the first reference shape, and the peak off-time value is generated in real time, based upon the determined count and the second reference shape.

32. The method of claim 29, further comprising:
responsive to determining that the count corresponds to the first range or the third range of the phase of the input voltage signal, determining the turn-on timings of the switch so as to keep the switch off for a first predetermined fixed duration and determining the turn-off timings of the switch so as to keep the switch on for a second predetermined fixed duration.

33. The method of claim 29, wherein the first reference shape of the peak current values comprises a trapezoid formed by the peak current values corresponding to a first count, a second count higher than the first count, a third count higher than the second count, a fourth count higher than the third count, a fifth count higher than the fourth count, and a sixth count higher than the fifth count, and wherein:
the first range includes the counts from the first count to the second count;
the second range includes the counts from the second count to the fifth count;
the third range includes the counts from the fifth count to the six count, the counts being reset at the sixth count to be same as the first count; and
the peak current values increase substantially linearly from zero to a first peak current value at a first rate when the count is between the first count and the second count, increase substantially linearly from the first peak current value to a second peak current value at a second rate when the count is between the second count and the third count, is constant at the second peak current value when the count is between the third count and the fourth count, decreases substantially linearly from the second peak current value to the first peak current value at a third rate when the count is between the fourth count and the fifth count, and decreases substantially linearly from the first peak current value to zero at a fourth rate when the count is between the fifth count and the six count.

34. The method of claim 33, wherein:
the input voltage signal is a full-wave rectified AC voltage signal having a phase range of 0 to 180 degrees; and
the first count, the second count, the third count, the fourth count, the fifth count, and the sixth count correspond to phases of 0 degrees, 17.5 degrees, 62.5 degrees, 117.5 degrees, 162.5 degrees, and 180 degrees, respectively, of the full-wave rectified AC voltage signal.

35. The method of claim 33, wherein the second peak current value is equal to 3 times the first peak current value.

36. The method of claim 29, wherein the second reference shape of the peak off-time values is formed by the peak off-time values corresponding to a first count, a second count higher than the first count, a third count higher than the second count, a fourth count higher than the third count, a fifth count higher than the fourth count, and a sixth count higher than the fifth count, and wherein:
the first range includes the counts from the first count to the second count;
the second range includes the counts from the second count to the fifth count;
the third range includes the counts from the fifth count to the six count, the counts being reset at the sixth count to be same as the first count; and
the peak off-time values are constant at a first peak off-time value when the count is between the first count and the second count, increase substantially linearly from the first peak off-time value to a second peak off-time value at a first rate when the count is between the second count and the third count, are constant at the second peak off-time value when the count is between the third count and the fourth count, decreases substantially linearly from the second peak off-time value to the first peak off-time value at a second rate when the count is between the fourth count and the fifth count, and are constant at the first peak off-time value when the count is between the fifth count and the six count.

37. The method of claim 36, wherein:
the input voltage signal is a full-wave rectified AC voltage signal having a phase range of 0 to 180 degrees; and
the first count, the second count, the third count, the fourth count, the fifth count, and the sixth count correspond to phases of 0 degrees, 17.5 degrees, 62.5 degrees, 117.5 degrees, 162.5 degrees, and 180 degrees, respectively, of the full-wave rectified AC voltage signal.

38. The method of claim 36, wherein the second peak off-time value is in a range of 5/2 of the first peak off-time value to 3/2 of the first peak off-time value.

39. The method of claim 29, further comprising:
determining whether a load coupled to the power converter is a low load; and
responsive to determining that the load is a low load, determining the turn-on timings and the turn-off timings of the switch based upon pulse frequency modulation.

40. A flyback-type AC to DC power converter, comprising:
a flyback power stage for transferring electrical power received in the form of an AC input voltage signal from a power source to a load;
a switch in the power stage that electrically couples or decouples the load to or from the power source; and
a switch controller coupled to the switch for shaping input current to the power converter based upon a first reference shape of peak current values and a second reference shape of peak off-time values, wherein the switch controller:
determines a count corresponding to a phase of the AC input voltage signal, the count corresponding to one of at least a first range, a second range, and a third range of the phase of the input voltage signal;
responsive to determining that the count corresponds to the second range of the phase of the input voltage signal, determines turn-on timings and turn-off timings of the switch based upon one or more operation modes, at least one of the operation modes being a peak current switching mode that determines the turn-off timings of the switch so as to keep the switch on until a current through the switch reaches the peak current value corresponding to the determined count at which time the switch is turned off, and at least another one of the operation modes being a shaped off-time switching mode that determines the turn-on timings of the switch so as to keep the switch off until a duration of the off-time of the switch reaches the peak off-time value corresponding to the count at which time the switch is turned on; and
controls the switch to be turned on and off based upon the determined turn-on timings and the determined turn-off timings, respectively.

41. The flyback-type AC to DC power converter of claim 40, wherein the switch controller derives the peak current value from a first table storing a plurality of the peak current values and the switch controller derives the peak off-time value from a second table storing a plurality of the peak off-time values.

42. The flyback-type AC to DC power converter of claim 40, wherein the switch controller generates the peak current value in real time, based upon the determined count and the first reference shape, and the switch controller generates the peak off-time value in real time, based upon the determined count and the second reference shape.

43. The flyback-type AC to DC power converter of claim 40, wherein the switch controller:

responsive to determining that the count corresponds to the first range or the third range of the phase of the input voltage signal, determines the turn-on timings of the switch so as to keep the switch off for a first predetermined fixed duration and determines the turn-off timings of the switch so as to keep the switch on for a second predetermined fixed duration.

44. The flyback-type AC to DC power converter of claim 40, wherein the first reference shape of the peak current values comprises a trapezoid formed by the peak current values corresponding to a first count, a second count higher than the first count, a third count higher than the second count, a fourth count higher than the third count, a fifth count higher than the fourth count, and a sixth count higher than the fifth count, and wherein:

the first range includes the counts from the first count to the second count;

the second range includes the counts from the second count to the fifth count;

the third range includes the counts from the fifth count to the six count, the counts being reset at the sixth count to be same as the first count; and the peak current values increase substantially linearly from zero to a first peak current value at a first rate when the count is between the first count and the second count, increase substantially linearly from the first peak current value to a second peak current value at a second rate when the count is between the second count and the third count, is constant at the second peak current value when the count is between the third count and the fourth count, decreases substantially linearly from the second peak current value to the first peak current value at a third rate when the count is between the fourth count and the fifth count, and decreases substantially linearly from the first peak current value to zero at a fourth rate when the count is between the fifth count and the six count.

45. The flyback-type AC to DC power converter of claim 44, wherein:

the input voltage signal is a full-wave rectified AC voltage signal having a phase range of 0 to 180 degrees; and the first count, the second count, the third count, the fourth count, the fifth count, and the sixth count correspond to phases of 0 degrees, 17.5 degrees, 62.5 degrees, 117.5 degrees, 162.5 degrees, and 180 degrees, respectively, of the full-wave rectified AC voltage signal.

46. The flyback-type AC to DC power converter of claim 44, wherein the second peak current value is equal to 3 times the first peak current value.

47. The flyback-type AC to DC power converter of claim 40, wherein the second reference shape of the peak off-time values is formed by the peak off-time values corresponding to a first count, a second count higher than the first count, a third count higher than the second count, a fourth count higher than the third count, a fifth count higher than the fourth count, and a sixth count higher than the fifth count, and wherein:

the first range includes the counts from the first count to the second count;

the second range includes the counts from the second count to the fifth count;

the third range includes the counts from the fifth count to the six count, the counts being reset at the sixth count to be same as the first count; and the peak off-time values are constant at a first peak off-time value when the count is between the first count and the second count, increase substantially linearly from the first peak off-time value to a second peak off-time value at a first rate when the count is between the second count and the third count, are constant at the second peak off-time value when the count is between the third count and the fourth count, decreases substantially linearly from the second peak off-time value to the first peak off-time value at a second rate when the count is between the fourth count and the fifth count, and are constant at the first peak off-time value when the count is between the fifth count and the six count.

48. The flyback-type AC to DC power converter of claim 47, wherein:

the input voltage signal is a full-wave rectified AC voltage signal having a phase range of 0 to 180 degrees; and the first count, the second count, the third count, the fourth count, the fifth count, and the sixth count correspond to phases of 0 degrees, 17.5 degrees, 62.5 degrees, 117.5 degrees, 162.5 degrees, and 180 degrees, respectively, of the full-wave rectified AC voltage signal.

49. The flyback-type AC to DC power converter of claim 47, wherein the second peak off-time value is in a range of $\frac{5}{2}$ of the first peak off-time value to $\frac{3}{2}$ of the first peak off-time value.

50. The flyback-type AC to DC power converter of claim 40, wherein the switch controller:

determines whether a load coupled to the power converter is a low load; and responsive to determining that the load is a low load, determines the turn-on timings and the turn-off timings of the switch based upon pulse frequency modulation.

51. A controller for shaping an input current to a flyback-type AC to DC power converter, the power converter including a flyback power stage for transferring electrical power from a power source to a load and a switch in the flyback power stage that is controlled by the controller and electrically couples or decouples the load to or from the power source, the controller comprising:

a current shaper module for determining waveform synthesis parameters based upon an AC input voltage signal and a first reference shape of peak current values and a second reference shape of peak off-time values, and for determining a count corresponding to a phase of the AC input voltage signal, the count corresponding to one of at least a first range, a second range, and a third range of the phase of the input voltage signal;

an operation mode selector module receiving the waveform synthesis parameters and the count, and selecting at least one of a plurality of operation modes configured to determine turn-on timings and turn-off timings of the switch, at least one of the operation modes being a peak current switching mode configured to determine the turn-off timings of the switch so as to keep the switch on until a current through the switch reaches the peak current value corresponding to the determined count at which time the switch is turned off, and at least another one of the operation modes being a shaped off-time switching mode configured to determine the turn-on timings of the switch so as to keep the switch off until a duration of the off-time of the switch reaches the peak off-time value corresponding to the count at which time the switch is turned on; and a current waveform synthesizer module determining the turn-on timings and turn-off timings of the switch based upon the selected operation mode and for controlling the switch in accordance with the determined turn-off timings and the determined turn-on timings of the switch, respectively.

52. The controller of claim 51, wherein the current waveform synthesizer module derives the peak current value from a first table storing a plurality of the peak current values and the current waveform synthesizer module derives the peak off-time value from a second table storing a plurality of the peak off-time values.

53. The controller of claim 51, wherein the current waveform synthesizer module generates the peak current value in real time, based upon the determined count and the first reference shape, and the current waveform synthesizer generates the peak off-time value in real time, based upon the determined count and the second reference shape.

54. The controller of claim 51, wherein:
responsive to the current shaper module determining that the count corresponds to the first range or the third range of the phase of the input voltage signal, the operation mode selector module selecting a fixed on-time and fixed off-time switching mode, the fixed-on-time and fixed off-time switching mode configured to determine the turn-on timings of the switch so as to keep the switch off for a first predetermined fixed duration and to determine the turn-off timings of the switch so as to keep the switch on for a second predetermined fixed duration.

55. The controller of claim 51, wherein the first reference shape of the peak current values comprises a trapezoid formed by the peak current values corresponding to a first count, a second count higher than the first count, a third count higher than the second count, a fourth count higher than the third count, a fifth count higher than the fourth count, and a sixth count higher than the fifth count, and wherein:
the first range includes the counts from the first count to the second count;
the second range includes the counts from the second count to the fifth count;
the third range includes the counts from the fifth count to the six count, the counts being reset at the sixth count to be same as the first count; and
the peak current values increase substantially linearly from zero to a first peak current value at a first rate when the count is between the first count and the second count, increase substantially linearly from the first peak current value to a second peak current value at a second rate when the count is between the second count and the third count, is constant at the second peak current value when the count is between the third count and the fourth count, decreases substantially linearly from the second peak current value to the first peak current value at a third rate when the count is between the fourth count and the fifth count, and decreases substantially linearly from the first peak current value to zero at a fourth rate when the count is between the fifth count and the six count.

56. The controller of claim 55, wherein:
the input voltage signal is a full-wave rectified AC voltage signal having a phase range of 0 to 180 degrees; and
the first count, the second count, the third count, the fourth count, the fifth count, and the sixth count correspond to phases of 0 degrees, 17.5 degrees, 62.5 degrees, 117.5 degrees, 162.5 degrees, and 180 degrees, respectively, of the full-wave rectified AC voltage signal.

57. The controller of claim 55, wherein the second peak current value is equal to 3 times the first peak current value.

58. The controller of claim 51, wherein the second reference shape of the peak off-time values is formed by the peak off-time values corresponding to a first count, a second count higher than the first count, a third count higher than the second count, a fourth count higher than the third count, a fifth count higher than the fourth count, and a sixth count higher than the fifth count, and wherein:
the first range includes the counts from the first count to the second count;
the second range includes the counts from the second count to the fifth count;
the third range includes the counts from the fifth count to the six count, the counts being reset at the sixth count to be same as the first count; and
the peak off-time values are constant at a first peak off-time value when the count is between the first count and the second count, increase substantially linearly from the first peak off-time value to a second peak off-time value at a first rate when the count is between the second count and the third count, are constant at the second peak off-time value when the count is between the third count and the fourth count, decreases substantially linearly from the second peak off-time value to the first peak off-time value at a second rate when the count is between the fourth count and the fifth count, and are constant at the first peak off-time value when the count is between the fifth count and the six count.

59. The controller of claim 58, wherein:
the input voltage signal is a full-wave rectified AC voltage signal having a phase range of 0 to 180 degrees; and
the first count, the second count, the third count, the fourth count, the fifth count, and the sixth count correspond to phases of 0 degrees, 17.5 degrees, 62.5 degrees, 117.5 degrees, 162.5 degrees, and 180 degrees, respectively, of the full-wave rectified AC voltage signal.

60. The controller of claim 58, wherein the second peak off-time value is in a range of $\frac{5}{2}$ of the first peak off-time value to $\frac{3}{2}$ of the first peak off-time value.

61. The controller of claim 51, wherein the operation mode selector module selects a pulse frequency modulation mode for determining the turn-on timings and the turn-off timings of the switch based upon pulse frequency modulation if a load coupled to the power converter is a low load.

62. A controller for shaping an input current to a flyback-type AC to DC power converter based upon a first reference shape of peak current values and a second reference shape of peak off-time values, the power converter including a flyback power stage for transferring electrical power received in a form of input voltage signal from a power source to a load, and a switch in the power stage that is controlled by the controller and electrically couples or decouples the load to or from the power source, wherein the controller:
determines a count corresponding to a phase of the AC input voltage signal, the count corresponding to one of at least a first range, a second range, and a third range of the phase of the input voltage signal;
responsive to determining that the count corresponds to the second range of the phase of the input voltage signal, determines turn-on timings and turn-off timings of the switch based upon one or more operation modes, at least one of the operation modes being a peak current switching mode that determines the turn-off timings of the switch so as to keep the switch on until a current through the switch reaches the peak current value corresponding to the determined count at which time the switch is turned off, and at least another one of the operation modes being a shaped off-time switching mode that determines the turn-on timings of the switch so as to keep the switch off until a duration of the off-time of the switch reaches the peak off-time value corresponding to the count at which time the switch is turned on; and
controls the switch to be turned on and off based upon the determined turn-on timings and the determined turn-off timings, respectively.

* * * * *